US008630293B2

(12) United States Patent
Cohen et al.

(10) Patent No.: US 8,630,293 B2
(45) Date of Patent: Jan. 14, 2014

(54) SOLAR POWER PLANT WITH SCALABLE COMMUNICATIONS PROTOCOL

(75) Inventors: Gilbert Cohen, Cary, NC (US); David Rock, Ridgecrest, CA (US); Coleman Moore, Westminster, CO (US); Stewart Wildman, Wake Forest, NC (US)

(73) Assignee: Acciona Solar Power, Henderson, NV (US)

( * ) Notice: Subject to any disclaimer, the term of this patent is extended or adjusted under 35 U.S.C. 154(b) by 71 days.

(21) Appl. No.: 12/844,749

(22) Filed: Jul. 27, 2010

(65) Prior Publication Data

US 2011/0160924 A1   Jun. 30, 2011

Related U.S. Application Data

(60) Provisional application No. 61/228,932, filed on Jul. 27, 2009.

(51) Int. Cl.
*F24J 2/38* (2006.01)

(52) U.S. Cl.
USPC ........................................ 370/392; 250/203.4

(58) Field of Classification Search
USPC ................................ 370/252, 392; 250/203.4
See application file for complete search history.

(56) References Cited

U.S. PATENT DOCUMENTS

| | | | |
|---|---|---|---|
| 4,262,195 A | 4/1981 | White et al. | |
| 4,516,018 A | 5/1985 | Bodenheimer et al. | |
| 4,672,191 A | 6/1987 | Cofield | |
| 4,892,142 A | 1/1990 | Labaton | |
| 5,019,458 A | 5/1991 | Elgat et al. | |
| 5,293,620 A | 3/1994 | Barabash et al. | |
| 5,701,120 A | 12/1997 | Perelman et al. | |
| 6,065,386 A | 5/2000 | Rub et al. | |
| 6,465,725 B1 | 10/2002 | Shibata et al. | |
| 6,624,532 B1 * | 9/2003 | Davidow et al. | ................ 307/39 |
| 6,705,311 B1 | 3/2004 | Schwartzman et al. | |
| 6,832,608 B2 | 12/2004 | Barkai et al. | |
| 7,127,305 B1 | 10/2006 | Palmon | |
| 7,385,363 B2 | 6/2008 | Schemm | |
| 7,566,981 B2 | 7/2009 | Kunkel et al. | |
| 7,690,377 B2 | 4/2010 | Goldman et al. | |
| 7,845,172 B2 | 12/2010 | Goldman | |
| 7,958,830 B2 | 6/2011 | Schemm et al. | |
| 2002/0174172 A1 | 11/2002 | Hatalkar | |
| 2003/0169200 A1 | 9/2003 | Urban et al. | |

(Continued)

OTHER PUBLICATIONS

Field Control Server Manual Saguaro Solar Facility, 25 pages, Oct. 3, 2006.

(Continued)

*Primary Examiner* — Melvin Marcelo
(74) *Attorney, Agent, or Firm* — Knobbe Martens Olson & Bear LLP

(57) ABSTRACT

A solar collector controller that can process solar field control commands can include a network interface that can receive a variable-length data packet with a collector controller. The collector controller can control one or more solar collectors. In addition, the variable-length data packet can include a header segment identifying a command to be performed by the collector controller and a data segment having one or more parameters associated with the command. The data segment can have a length that depends on a type of the command. Moreover, the solar collector controller can include a processor that can execute the command in response to receiving the data packet.

14 Claims, 33 Drawing Sheets

(56) References Cited

U.S. PATENT DOCUMENTS

| | | |
|---|---|---|
| 2004/0050380 A1 | 3/2004 | Abe et al. |
| 2004/0120357 A1 | 6/2004 | Kekki |
| 2004/0258012 A1 | 12/2004 | Ishii |
| 2005/0097478 A1 | 5/2005 | Killian et al. |
| 2005/0251425 A1 | 11/2005 | Fox |
| 2006/0072262 A1* | 4/2006 | Paik et al. ............ 361/62 |
| 2006/0096586 A1 | 5/2006 | Hayden |
| 2006/0162772 A1 | 7/2006 | Presher, Jr. et al. |
| 2008/0011288 A1 | 1/2008 | Olsson |
| 2008/0011290 A1 | 1/2008 | Goldman et al. |
| 2008/0066735 A1 | 3/2008 | Yeh et al. |
| 2008/0279166 A1 | 11/2008 | Carty et al. |
| 2008/0280569 A1 | 11/2008 | Hazani et al. |
| 2009/0038608 A1 | 2/2009 | Caldwell |
| 2009/0138638 A1 | 5/2009 | Russo et al. |
| 2009/0159078 A1 | 6/2009 | Penciu |
| 2009/0159113 A1 | 6/2009 | Morimoto |
| 2009/0178668 A1 | 7/2009 | Boggavarapu |
| 2009/0217921 A1 | 9/2009 | Gilon et al. |
| 2009/0231342 A1 | 9/2009 | Smith et al. |
| 2009/0250052 A1 | 10/2009 | Gilon et al. |
| 2010/0006087 A1 | 1/2010 | Gilon et al. |
| 2010/0139644 A1 | 6/2010 | Schwarzbach et al. |
| 2010/0175738 A1 | 7/2010 | Huss et al. |
| 2010/0191378 A1 | 7/2010 | Gilon et al. |
| 2010/0236239 A1 | 9/2010 | Kroizer et al. |
| 2010/0282242 A1 | 11/2010 | Gilon et al. |
| 2010/0300510 A1 | 12/2010 | Goldman et al. |
| 2011/0036343 A1 | 2/2011 | Kroyzer et al. |
| 2011/0088396 A1 | 4/2011 | Katz et al. |
| 2011/0126883 A1 | 6/2011 | Goldman |

OTHER PUBLICATIONS

Field Control Server Manual Addendum I, Communications & Connectivity Guide, Saguaro Solar Facility, 3 pages, Oct. 3, 2006.

AC500. The Scalable control unit-ideal for solar-tracking photovoltaic systems. ABB Stotz-Kontakt GmbH. Nov. 2008. [retrieved on Sep. 7, 2010]. Retrieved from the internet http://www05.abb.com/global/scot/scot209.nsf/vertydisplay/fe4af79064a389cac1257561004bad3b/$File/2CDC12580556B0202.pdf> pp. 1-8.

International Search Report and Written Opinion issued in International application No. PCT/US2010/043428 on Nov. 24, 2010.

Enhancement Electronics, Inc., "The SolarTrak Controller System," 2002.

Office Action mailed Jul. 17, 2012 in co-owned U.S. Appl. No. 12/844,752.

Office Action mailed Sep. 12, 2012 in co-owned U.S. Appl. No. 12/855,762.

Final Office Action mailed Mar. 6, 2013 in co-owned U.S. Appl. No. 12/844,752.

Final Office Action mailed Mar. 21, 2013 in co-owned U.S. Appl. No. 12/855,762.

* cited by examiner

*1800*

| AdLoC Parameters - 3D | | | ⊠ |
|---|---|---|---|
| Temp Limit | NULLC | U Temp Offset | NULLC |
| ThermCalib Hi | NULLC | ThermCalib Lo | NULLC |
| Inc Zero Angle | NULL | Inc Res | NULL |
| MPT On | NULL | MPT Off | NULL |
| Lck Pls Time | NULL | Mtr Timeout | NULL |
| VT DeadBand | NULL | VTDep Angle | NULL |
| Stow Acc | NULL | Stow DB | NULL |
| Stow Angle | NULL | Wind Angle | NULL |
| Maint Angle | NULL | Rot Axis | NULL |
| Latitude | NULL | Longitude | NULL |
| Elevation | NULL | GMT | NULL |
| Follow Angle | NULL | Group ID | NULL |
| M1 Spin Down | NULL | M2 Spin Down | NULL |
| Inc Trck Disp | NULL | Persist Inc Cnt | NULL |
| Fz Threshold | NULLC | | |

Field F2 Loop L9

| Location | Mode | Position | Sun Angle | Temperature | DeltaT |
|---|---|---|---|---|---|
| 17E | Offline | 000.00 | 000.00 | -18C | - |
| 17F | Offline | 000.00 | 000.00 | -18C | +0C |
| 17G | Offline | 000.00 | 000.00 | -18C | +0C |
| 17H | Offline | 000.00 | 000.00 | -18C | +0C |
| 18H | Offline | 000.00 | 000.00 | -18C | +0C |
| 18G | Offline | 000.00 | 000.00 | -18C | +0C |
| 18F | Offline | 000.00 | 000.00 | -18C | +0C |
| 18E | Offline | 000.00 | 000.00 | -18C | +0C |

| Loop Delta T | 0C |
|---|---|
| SCA Average Delta T | 00.00C |

FIG. 19

Solar Field Mode Status

| Mode | North | South | Totals |
|---|---|---|---|
| Idle | 0 / 0% | 0 / 0% | 0/0% |
| s Trck | 0 / 0% | 0 / 0% | 0/0% |
| v Track | 0 / 0% | 0 / 0% | 0/0% |
| Stow | 0 / 0% | 0 / 0% | 0/0% |
| Position | 0 / 0% | 0 / 0% | 0/0% |
| Follow | 0 / 0% | 0 / 0% | 0/0% |
| Freeze | 0 / 0% | 0 / 0% | 0/0% |
| Deploy | 0 / 0% | 0 / 0% | 0/0% |
| Maint | 0 / 0% | 0 / 0% | 0/0% |
| Init | 0 / 0% | 0 / 0% | 0/0% |
| Offline | 384 / 100% | 376 / 100% | 760/100% |

FIG. 20

SOLAR POWER PLANT WITH SCALABLE COMMUNICATIONS PROTOCOL

BACKGROUND

With finite amounts of fossil fuels stored in the Earth's crust, significant efforts have been spent to develop cost-effective renewable energy solutions. Amongst these efforts, harvesting the sun's radiation energy represents a promising solution. Heat energy harnessed from the sun can be converted into electric power or can be stored for other uses.

Initially, in an attempt to capture such heat energy from solar rays, solar collecting systems employed large flat surface materials conducive to the absorption and storage of heat. For unobstructed exposure to solar rays, these surface materials were typically positioned and secured on top of buildings or facilities where the captured heat could be used immediately or stored for future use.

Improvements within the solar energy field introduced the reflection of solar rays onto smaller surfaces, intensely concentrating and focusing the solar rays for more efficient heating. A parabolic structure, when used as a reflective surface, directs reflects rays through one point or focal zone. If positioned correctly in relation to the sun, many rays can pass through a predetermined point or linear zone within the inner area of the parabolic reflective surface.

Responding to these solar energy discoveries and improvements, the market introduced various stationary parabolic reflective troughs. Solar rays reflect off the surface of the parabolic trough, focusing onto a fluid-filled conduit which lies along the trough's focal point. The fluid flowing through this conduit can be used to heat water into steam, which can be used to rotate a turbine and create electricity.

SUMMARY

In certain embodiments, a method of processing solar field control commands includes receiving a variable-length data packet with a collector controller, where the collector controller can control one or more solar collectors. The variable-length data packet can include a header segment identifying a command to be performed by the collector controller and a data segment having one or more parameters associated with the command. The data segment can include a length that depends on a type of the command. Further, the method can include executing the command with a processor of the collector controller in response to receiving the data packet.

Additionally, in some embodiments, a solar collector controller that can process solar field control commands includes a network interface that can receive a variable-length data packet with a collector controller. The collector controller can control one or more solar collectors. In addition, the variable-length data packet can include a header segment identifying a command to be performed by the collector controller and a data segment having one or more parameters associated with the command. The data segment can have a length that depends on a type of the command. Moreover, the solar collector controller can include a processor that can execute the command in response to receiving the data packet.

In still other embodiments, a method of processing solar field control commands can include receiving a command broadcasted to a plurality of collector controllers with a selected one of the collector controllers. Each of the plurality of collector controllers can control one or more solar collectors of a solar field. The method can also include identifying, with the selected collector controller, a group identifier specified by the command. The group identifier can be configured to identify a subgroup of the plurality of collector controllers, where the subgroup is authorized to execute the command. The method can further include determining, with the selected collector controller, whether the group identifier corresponds to a preassigned group identifier of the selected collector controller. Moreover, the method can include executing the command in a processor of the selected collector controller in response to determining that the group identifier corresponds to the preassigned group identifier.

For purposes of summarizing the disclosure, certain aspects, advantages and novel features of the inventions have been described herein. It is to be understood that not necessarily all such advantages can be achieved in accordance with any particular embodiment of the inventions disclosed herein. Thus, the inventions disclosed herein can be embodied or carried out in a manner that achieves or optimizes one advantage or group of advantages as taught herein without necessarily achieving other advantages as can be taught or suggested herein.

BRIEF DESCRIPTION OF THE DRAWINGS

Throughout the drawings, reference numbers can be re-used to indicate correspondence between referenced elements. The drawings are provided to illustrate embodiments of the inventions described herein and not to limit the scope thereof.

FIGS. 15 through 21 illustrate embodiments of solar site control interfaces.

DETAILED DESCRIPTION

I. Introduction

Many fossil fuel and nuclear power plants are designed to operate at a specific rated capacity that does not increase over the life of the plant. This is also the case with many solar power installations. Solar power plants generally include a fixed number of solar collectors, which can include parabolic troughs, heliostats and associated towers, photovoltaic cells, solar collector dishes, combinations of the same, and the like. As the demand for solar energy grows, however, it can be desirable to increase the production of these plants by adding more collectors. Unfortunately, the computer networks, communications protocols, control software, and control hardware in many existing solar power plants are designed for a specific plant configuration and cannot easily scale up to meet an increase in the number of collectors.

This disclosure describes scalable computer systems and methods for facilitating rapid and cost-efficient increased production at solar power plants. These systems and methods can also be used to design and build new solar power plants more rapidly and efficiently.

These systems and methods are described primarily in the context of parabolic trough collectors. However, some or all of the features described herein could also be used in power installations that employ other types of collectors, such as any of the types of collectors described above. Thus, in addition to having their ordinary meaning, the terms "collector," "solar collector," and the like can include any solar device or collection of solar devices used to collect energy from the sun. In addition, certain of the features described herein are not limited to solar power plants but can also be implemented in solar installations on residential and/or commercial buildings or lands.

II. Scalable Solar Plant Overview

Figure 1:
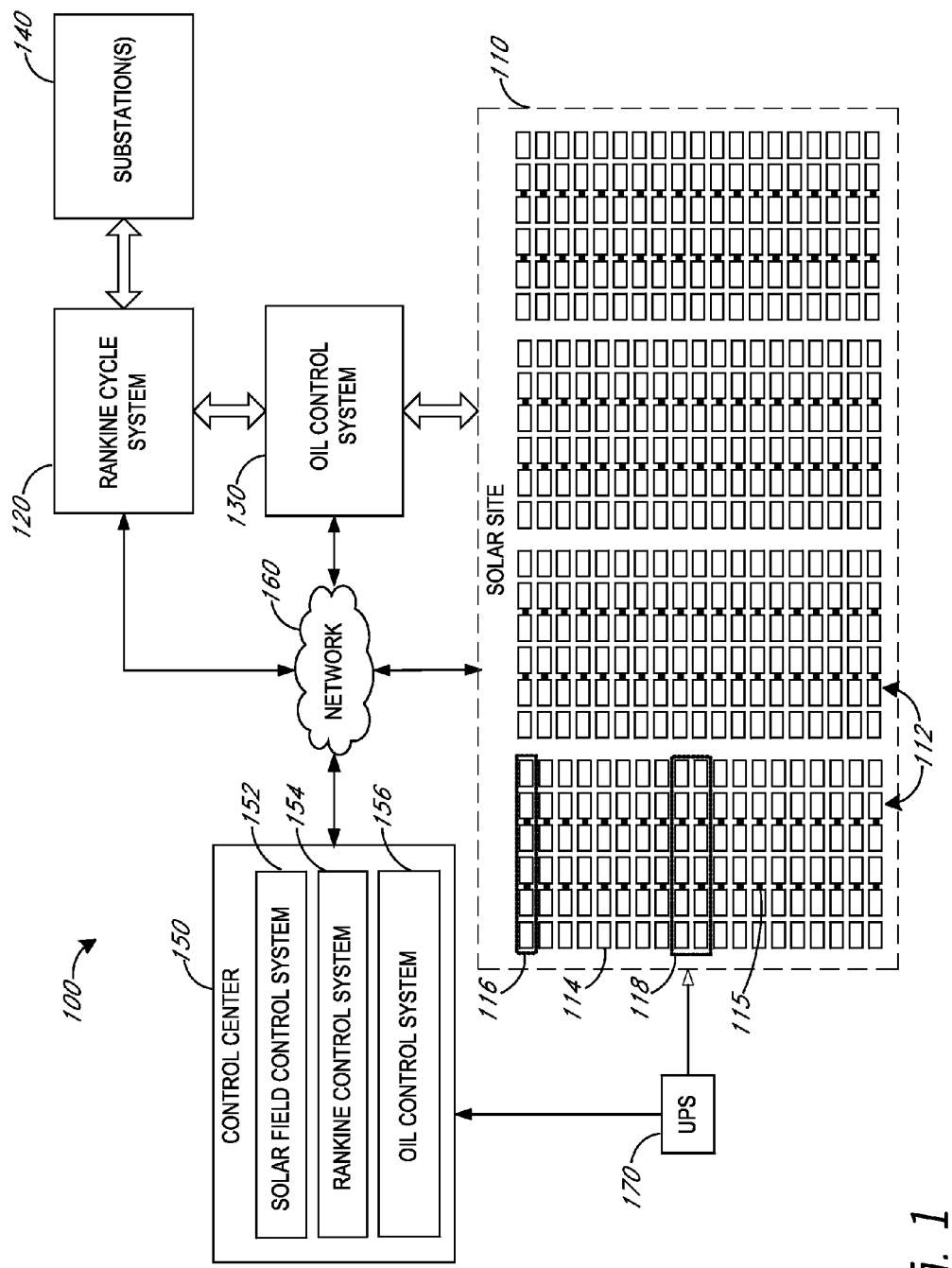
FIG. 1 illustrates an embodiment of a scalable solar power plant.

FIG. 1 illustrates an embodiment of a scalable solar power plant 100. The solar plant 100 includes a solar site 110 having one or more fields 112 of solar collectors 114. In certain embodiments, the collectors 114 can be parabolic troughs (see FIGS. 4 and 7A). A parabolic trough collector 114 can include one or more parabolic mirrors that each focus light from the sun on a pipe running the length of the trough (see FIGS. 4 and 7A). The pipe is placed at the focal point of the parabola to increase or maximize the amount of solar energy impinging on the pipe. The collectors 114 can be arranged in rows 116 to allow the pipe to extend through several collectors 114.

A heat transfer fluid such as oil or molten salt flows through the pipe, which is heated by the solar energy focused by the collectors 114. In one embodiment, heat transfer fluid flows through a loop 118 of two or more rows 116 of collectors 114 before entering a main line (not shown). The heat transfer fluid can be provided via the main line to a Rankine system 120, which uses the heated fluid to generate steam from water. The Rankine system 120 circulates the heat transfer fluid back to the solar site 110. The steam generated by the Rankine system 120 is provided to one or more turbines, which generate power. This power is provided to one or more substations 140 for commercial and/or residential consumption. The power can also be stored for later use in batteries, capacitors, combinations of the same, or the like.

Figure 4:
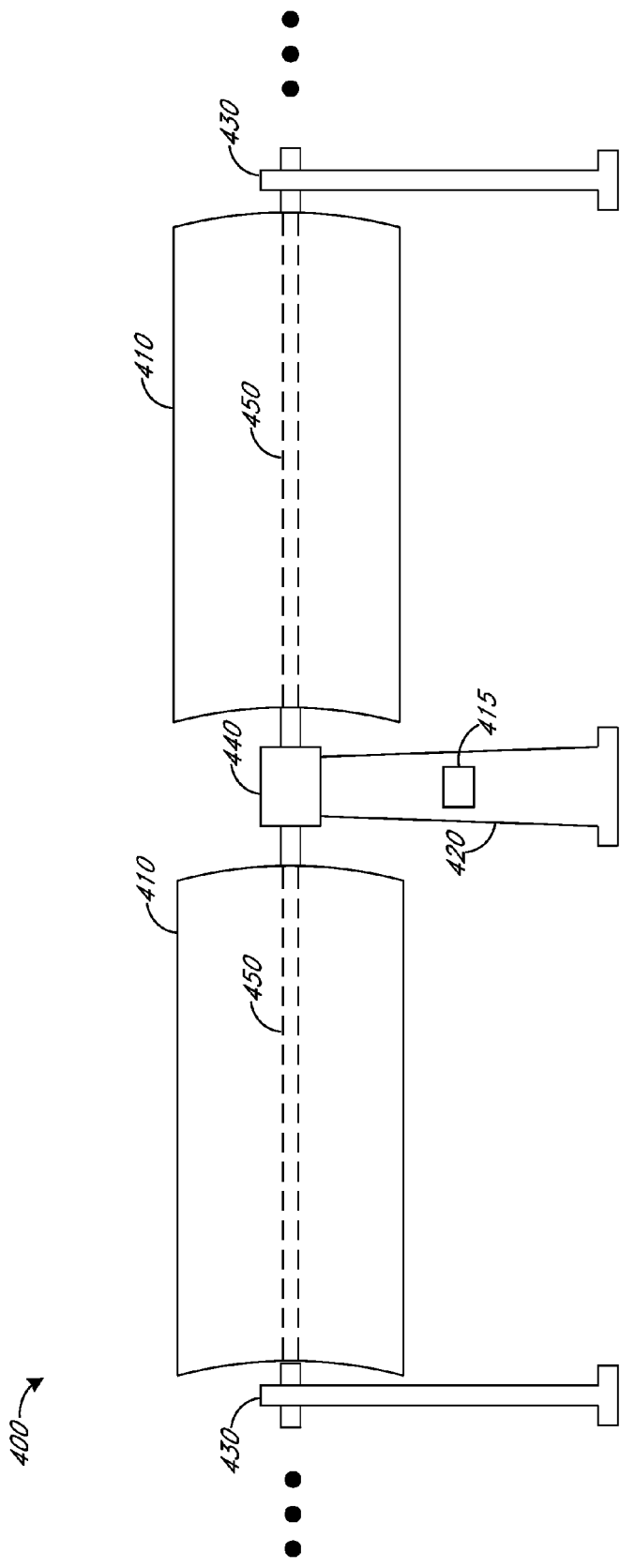
FIG. 4 illustrates an embodiment of a solar collector assembly.
Figure 5:
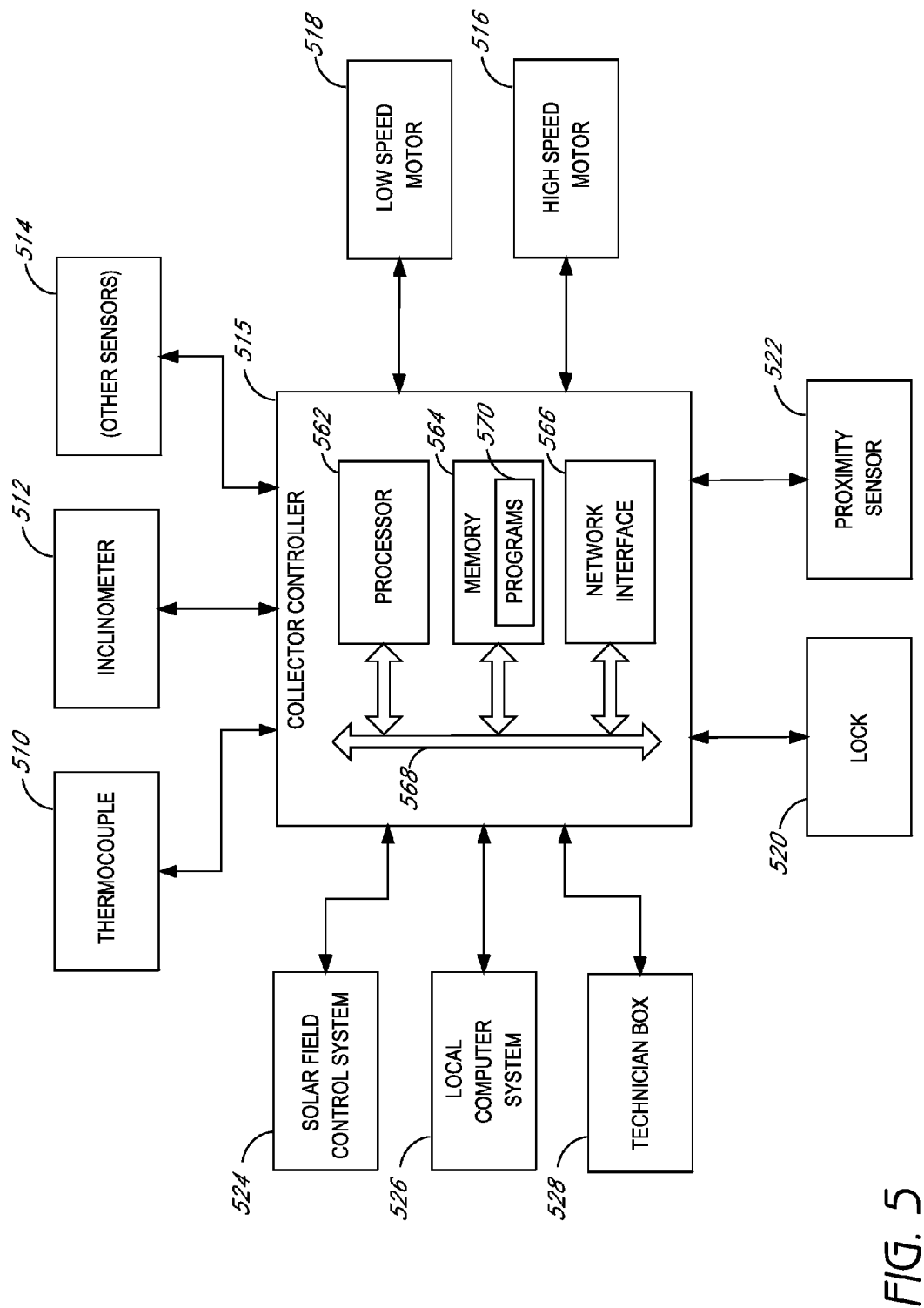
FIG. 5 illustrates an embodiment of a collector controller for controlling the solar collector assembly of FIG. 4.

Collector controllers 115 installed in the solar fields 112 can include hardware and/or firmware for controlling one or more of the collectors 114 (see also FIGS. 4 and 5). The collector controllers 115 can control the movement of the collectors 114 in certain embodiments by calculating a virtual sun angle, determining an estimated angle of one or more solar collectors with respect to the sun, and actuating one or more motors to bring the solar collectors in-line with the virtual sun angle. Together, a collector controller 115 and one or more collectors 114 controlled by the controller 115 can be referred to as a solar collector assembly (SCA).

A control center 150 is also provided in the solar plant 100. The control center 150 can include one or more computer systems 152, 154, 156 that can control the least some of the functions of the solar site 110, the Rankine system 120, and/or the power oil control system 130. In the depicted embodiment, these control systems include a solar field control system 152, a rankine control system 154, and an oil control system 156. Each of these systems 152, 154, 156 can include hardware and/or software for collecting data from and sending commands over a network 160 to the respective systems of the solar plant 100. The control systems 152, 154, 156 can operate at least partially automatically and also can be operated by a user.

The solar field control system 152 can receive data from the collector controllers 115. Data that can be provided from the collector controllers 115 can include, for example, temperature data for the heat transfer fluid, position data for the solar collectors, controller operation modes, over- and under-temperature alarm data, and other information. The solar field control system 152 can also provide a user interface that allows an operator to send commands to the collector controllers. Some example commands might include commands to track the sun and commands to stow a collector 114 out of direct sunlight for maintenance purposes or to block the wind from reaching other collectors 114.

Advantageously, in certain embodiments, the solar field control system 152 is highly customizable and scalable to accommodate upgrades to the solar site 110. Likewise, the collector controllers 115 and the network 160 can include features that facilitate site scalability. As a result, the solar power plant 100 can be scaled up in a cost efficient manner.

Among the many scalable features of the solar plant 100 described herein, one or more user interface provided by the solar field control system 152 can be configurable to easily track and operate additional solar collectors 114 or change the operation of collector controllers 115. In addition, a communications protocol is also provided in certain embodiments, which can allow variable length data packets to be sent to and from the collector controllers 115. The variable length nature of these packets can enable the collector controllers 115 to be customized to accept new commands. As a result, new features, including new instrumentation, can be added to the collector controllers 115 without substantially redesigning hardware and/or firmware of the collector controllers 115.

In certain embodiments, subgroups of the collector controllers 115 can be controlled using multiple threads of execution in the solar field control system 152. These multithreading features can increase efficient usage of hardware resources. In addition, multithreading can facilitate hardware scalability because an increase in the number of collector controllers 115 can be met with an increase in processing power in the solar field control system 152. Moreover, a specialized communications process can be used to efficiently poll data from and send commands to the collector controllers 115.

Moreover, the solar site 110 and the control center 150 are coupled with an uninterruptible power supply (UPS) 170 in certain embodiments to avoid damage to the collectors in the event of power failure. Other parts of the plant 100 could be connected to the UPS 170 as well in certain embodiments. A UPS that could power an entire solar field at once could be very expensive. To reduce the output power capacity and therefore cost of the UPS, the solar field control system 152 can stage certain power intensive functions of the collectors 114, such as mass collector movements.

These and other features of the scalable power plant 100 are described in greater detail below. In particular, example features of the collector controllers 115 are described below in more detail with respect to FIGS. 4 through 7. Example features of the solar field control system 152 are described below in more detail with respect to FIGS. 8 through 32. A brief introduction to the Rankine system 120 and the oil control system 130 follows in FIGS. 2 and 3.

Figure 2:
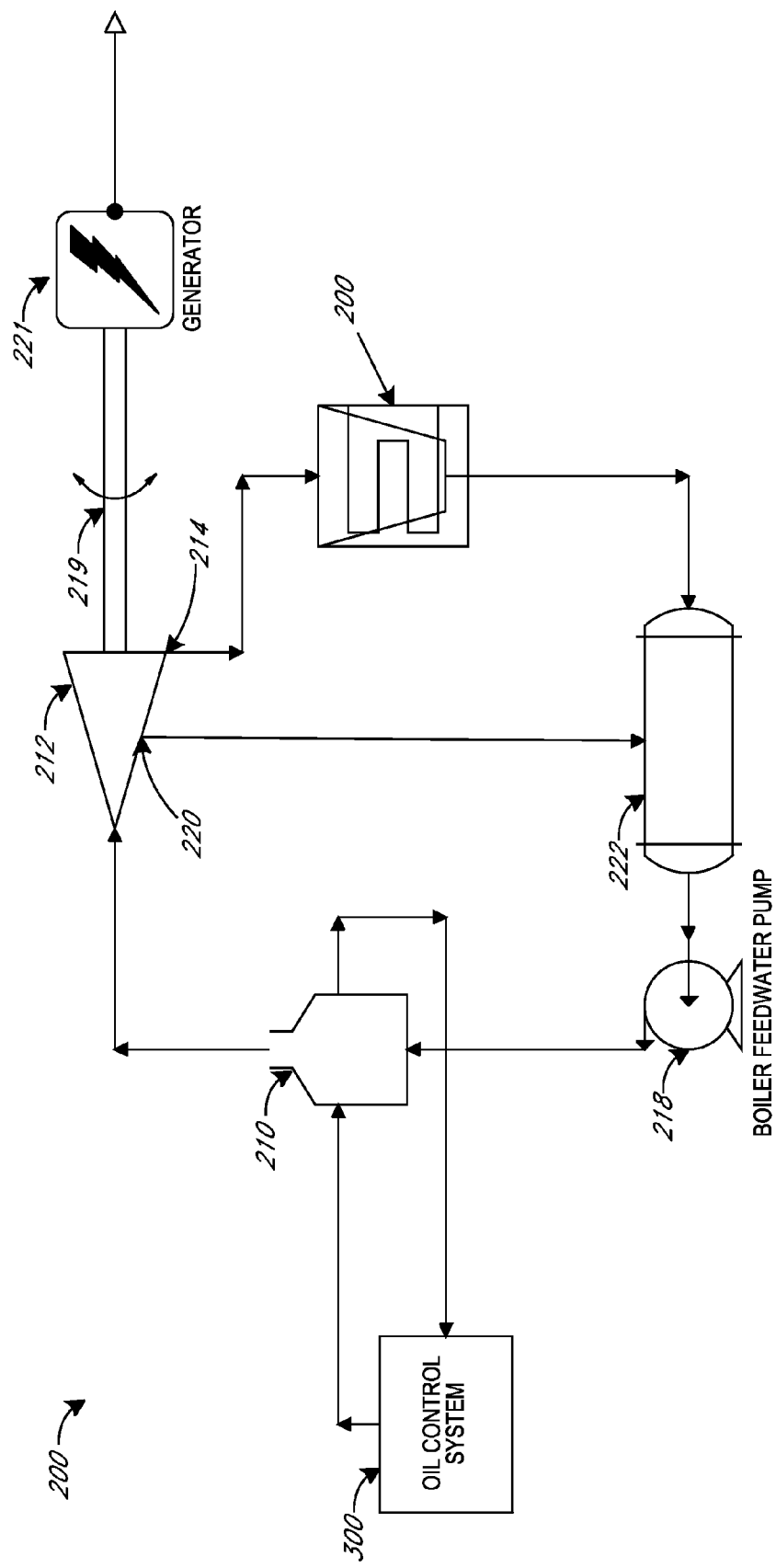
FIG. 2 illustrates an embodiment of a Rankine system of the solar power plant of FIG. 1.

FIG. 2 illustrates an embodiment of a Rankine system 200 of a solar power plant. The Rankine system 200 is an example of one implementation of the Rankine system 120 of FIG. 1. Further, it is to be noted that the Rankine system 200 is merely an example of one kind of system that can be used to convert heat into electricity, and that other systems can also be used. Additionally, the various components of the Rankine system 200 are only described generally because those of ordinary skill in the art are fully aware of the types of components included, methods of operation, and the general principles of operation of these systems. Further, these types of power generation systems are normally custom-designed for the specific application and thus the specific sizes, model names, capacities, and ratings of these various components would normally be determined based on a specific application. Further, design and construction services for such systems are commercially available from companies such as, for example, the Siemens Corporation, as well as others.

Figure 3:
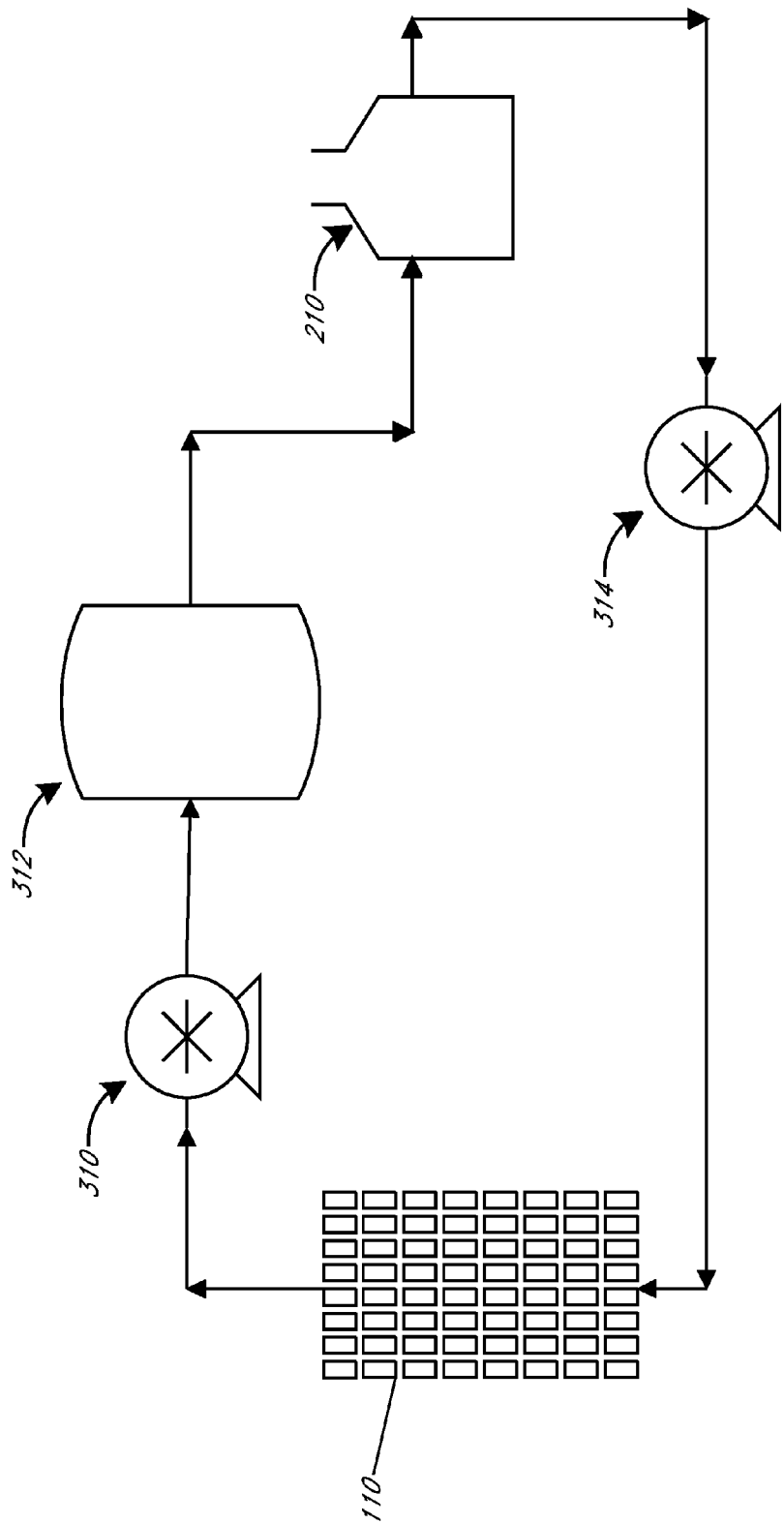
FIG. 3 illustrates an embodiment of an oil control system of the solar power plant of FIG. 1.

With continued reference to FIG. 3, the Rankine system 200 is configured to use heat from the solar site 110 to raise the temperature, and thereby vaporize water, to generate superheated steam. The superheated steam is expanded through a turbine which is used to deliver shaft power to an electrical generator, which outputs useful electric power, for example, in the form of alternating current which can be distributed by a grid system. The expanded steam is then condensed back into liquid water and pumped back into the boiler to be reused in the Rankine cycle. As noted above, this type of system is well-known in the art, and thus, is described only generally below.

With reference to FIG. 2, as noted above, oil which has been heated by the oil control system 130 can be circulated through a boiler 210. Water being circulated through the Rankine cycle system 200 is vaporized in the boiler 210 by the oil from the oil control system 130. As is customary in the power generation arts, the steam generated in the boiler 210 is heated until it reaches a "superheated" state. The superheated steam from the boiler 210 is then directed into a turbine 212.

The turbine 212 includes internal turbines that rotate as the superheated steam from the boiler 210 is expanded therethrough. Further, as is customary in this art, the pressure, flow rate, and power extracted from the steam is limited such that the steam exiting the turbine at the outlet 214 is still in a superheated state. This is because if the steam in the turbine 212 is excessively expanded, thereby allowing water droplets to form, the blades within the turbine 212 can be damaged.

The expanded steam leaving the turbine 212 is then condensed in the condenser 216. The condenser 216 can be a "wet" or "dry" type of condenser.

The condensed steam leaves the condenser 216 in the form of condensed water or "condensate". The condensate can then be fed to a boiler feed water pump 218. The boiler feed water pump is configured to raise the pressure of the condensate to the pressure required to support the vaporization of the water into superheated steam by the boiler 210 and to drive the turbine 212.

The turbine 212 can also include an output shaft 219 connected to an electrical generator 221. As the turbine 212 rotates by the expansion of steam therein, the output shaft 219 is driven so as to drive the generator 221. As is well known in this art, the generator 221 can be configured to provide electrical power in any known form, including a form usable by a grid system for electrical power distribution.

Optionally, the Rankine system 200 can include an optional regeneration circuit. In such a circuit, partially expanded steam can be discharged from the turbine 212 from an additional outlet 220. This partially expanded steam can be directed into the condensate heater 222

The condensate heater 222 can be configured to heat the condensate discharged from the condenser 216 with the partially expanded steam from the outlet 220 of the turbine 212. As such, partially expanded steam can be used to heat the condensate from the condenser 216 and thus improve the efficiency of the Rakine system 200. Although not illustrated, the partially expanded steam used by the condensate heater 222 can be condensed by the process of transferring heat into the condensate. The condensed steam from the condensate heater 222 can be returned to the condenser 216 and mixed therein with the condensate generated from the expanded steam from the outlet 214 of the turbine 212.

The above described Rankine system 200 is merely an example of a Rankine cycle system that can be used with the control center 150. Other types of Rankine cycle systems and other types of systems configured to generate electrical power from heat can also be used.

FIG. 3 illustrates an embodiment of an oil control system 300 of a solar power plant. The oil control system 300 is an example of one implementation of the oil control system 130 of FIG. 1. The oil control system 300 is configured to circulate in oil between the solar site 110 and the boiler 210 of the Rankine system 200. As such, the oil control system 300 delivers heat, collected by the solar site 110, to the water flowing into the boiler 210. By this process, the oil is cooled in the boiler 210 and is returned to the solar site 110 to be reheated.

As shown in FIG. 3, the oil control system 300 can include a return pump 310, a buffer tank 312, and a feed pump 314. In operation, the return pump 310 draws oil from the solar site 110, and pumps the oil to the buffer tank 312. Although not shown, additional valves, controls, and pumps can also be provided.

Oil from the buffer tank 312 can be delivered to the boiler 210 so as to vaporize boiler feed water into superheated steam, as noted above. After the oil is used to generate superheated steam, the oil is returned to be solar site 110 by the return pump 314. In some embodiments, the temperature of the oil leaving the solar site 110 can be as high as 750° F. and can return to the solar site 110 at about 500° F. However, the oil control system 300 can be designed to operate at other temperatures.

Optionally, the oil control system 300 can include supplemental heaters (not shown) configured to add supplemental heat into the system 300 in the event that there is insufficient sunlight for the solar site 110 to heat the oil to temperature above its "freezing point". For example, some oils that can be used in the oil control system 300 can have a freezing temperature as high as 60° F. Thus, the use of additional or supplemental heaters can be advantageous so as to prevent the oil from freezing with in the pipes incorporated into the oil control system 300.

III. Solar Collector Controller Overview

FIG. 4 illustrates an embodiment of a solar collector assembly (SCA) 400. In the depicted embodiment, the SCA 400 includes two collectors 410 and associated heat transfer pipes 450. While two collectors 410 are shown, an SCA can have fewer or more than two collectors 410 in other embodiments. The SCA 400 also includes pylons 420, 430 that support the collectors 410 and pipes 450. One of the pylons 420 includes an assembly 440 connected to both collectors 410.

The assembly 440 can include one or more motors for moving the collectors 410. As the sun moves across the sky, the motors can turn the collectors 410 to face the sun. By facing the sun, the collectors 410 can cause the sun's rays to focus on the pipes 450 (see also FIG. 7B). In some implementations, the assembly 440 includes a high-speed motor for large movements of the collectors 410 and a low-speed motor for fine movements of the collectors 410.

The assembly 440 can also include an inclinometer or shaft encoder for estimating an angle of the collectors 410 with respect to an artificial horizon. Angle information obtained from the inclinometer can be used to determine how closely the collectors 410 are tracking a solar elevation angle or another suitable sun angle. The assembly 440 can also include a thermocouple or other temperature measurement device for measuring the temperature of the heat transfer fluid. These temperature measurements can be used to gauge the placement and condition of the collectors 410 and pipes 450, determine whether emergency over- or under-temperature conditions exist, and so forth. Moreover, other instrumentation, such as flow meters, wind instruments, and the like can be included in the assembly 440 or in another component of the SCA 400.

The assembly 440 can also include a lock (not shown) they can hold the collectors 410 in place. The lock can be a solenoid lock, spring lock, or another suitable type of lock that can be used to prevent the collectors 410 from moving. A proximity switch for detecting the proximity of the collectors 410 to the lock can also be included in the assembly 440. The lock can be actuated to stow the collectors 410 in a position away from the sun for maintenance or other reasons. This position could be, for example, −30 degrees with respect to the horizon, −60 degrees, or at another position. One potential reason to stow the collectors 410 is to use the collectors 410 to shield other collectors (not shown) from the wind. One or more outside or other rows of collectors 410 can be stowed for this purpose, with more rows being stored for greater wind speeds.

A collector controller 415 is also attached to the pylon 415 in the depicted embodiment. This placement of the collector controller 415 is illustrative only, as the collector controller 415 could be placed in the assembly 440, in another location in the SCA 400, or in a location remote to the SCA 400. The collector controller 415 can include computer hardware and firmware (or software) for controlling the assembly 440. For example, the collector controller 415 can send commands to the assembly 440 to control the motors and the lock. The collector controller 415 can also obtain data from the inclinometer, thermocouple, and any other sensors that can be part of the SCA 400.

Advantageously, in certain embodiments, the collector controller 415 is programmed to periodically calculate a virtual sun angle, for example, a virtual sun elevation angle. The collector controller 415 can compare this virtual sun angle with the angle of the collectors 410 as determined in at least in part by the inclinometer. The collector controller 415 can actuate one or both of the motors to cause the collectors 410 to track the sun based at least partly on the difference between the virtual sun angle and an angle of the collectors 410. The collector controller 415 can calculate the virtual sun angle using a variety of data points. These data points can include a latitude and longitude of the controller 415 or solar site, date and time at the solar site, elevation of the collector 415 or solar site, Greenwich Mean Time (GMT) or time zone with respect to the solar site, Daylight Savings Time (DST) where applicable, and possibly other factors. In certain embodiments, the collector controller 415 can calculate the sun angle with a high degree of accuracy, such as within 1/100 degree of accuracy or better, at least in part by using a 16 bit processor.

As mentioned above, GPS position data can be used to determine the location (e.g., latitude and longitude) of the collector controller 415. In one embodiment, the collector controller 415 includes a GPS module that communicates with a global positioning system to obtain the GPS position data. In other embodiments, the GPS data can be supplied to the collector controller 415 by an external GPS module. The external GPS module can be operated by a technician, for example, who may connect the GPS module successively to each collector controller 415 in the solar site. Using a single external GPS module in this manner can save costs over installing a GPS module in every collector controller 415. Advantageously, in certain embodiments, using a specific collector controller 415 location obtained from the GPS data instead of a location for the whole site can improve the accuracy of the virtual sun angle calculation.

The collector controller 415 can calculate the virtual sun angle instead of obtaining sun angle data from a sun sensor. This is advantageous in some implementations because sun sensors can be expensive. If the virtual angle calculation is wrong on one of the collector controllers 415, causing a small number of collectors 410 to be inaccurately positioned, this error might not be propagated to the other collector controllers 415. In contrast, if the virtual sun angle were to be calculated by the solar field control system 152 of FIG. 1, an incorrect virtual sun angle could cause the entire site of collectors to be inaccurately positioned.

In other embodiments, the solar field control system 152 calculates the virtual sun angle instead of or in addition to the collector controller 415. Additionally, the collector controller 415 can use a sun sensor in some embodiments.

FIG. 5 illustrates a more detailed embodiment of a collector controller 515 for controlling an SCA, such as the SCA 400. The collector controller 515 is an example implementation of the collector controller 415 of FIG. 4. The collector controller 515 can include one or more processors 562, one or more memory devices 564, and one or more network interfaces 566. The memory 564 includes programs 570, which can include for more instructions for performing virtual sun angle calculations, for obtaining data from sensors, for communicating with other computing devices, and the like. The devices 562, 564, 566 can communicate with one another via a bus 568 or the like.

Several devices are shown interfacing with the collector controller 515, some of which were described above with respect to FIG. 4. For example, a thermocouple 510, inclinometer 512, and other sensors 514 (such as an optional sun sensor) can communicate with the collector controller 515. In addition, high- and low-speed motors 516, 518 as well as a lock 520 and associated proximity sensor 522 can communicate with the collector controller 515. In one embodiment, the collector controller 515 can include a separate motor driver board for driving one or both of the motors 516, 518 as well as optionally the lock 520. Using a separate motor driver board facilitates reduced costs if a circuit board for the collector controller 515 were to be redesigned.

Other devices showing communicating with the collector controller 515 include a solar field control system 524, a local computer system 526, and a technician box 528. The solar field control system 524 corresponds to the solar field control system 152 of FIG. 1 and is described in greater detail below with respect to FIGS. 8 through 32. In one embodiment, the collector controller 515 includes a half-duplex serial interface, such as an RS 485 interface, to communicate remotely with the solar field control system 524 (see FIG. 8). Other interfaces can be used, however.

The local computer system 526 can be a laptop, handheld device, or other computing device that is programmed to communicate with the collector controller 515. In one embodiment, the local computer system 526 can include the same or a similar program as is installed on the solar field control system 524. The local computer system 526 can therefore monitor and/or control the collector controller 515 in certain implementations. The collector controller 515 can have a suitable interface for communicating with the local computer system 526. In one embodiment, the interface is a VT100 interface implemented over a Universal Serial Bus (USB) connection. A wireless connection could also be used.

The technician box 528 can be a simplified control device that can allow a technician or other operator to manually control a collector without using a laptop computer. The box 528 might include functionality, for example, to actuate the motors 516, 518 or the lock to enable maintenance operations to be performed on the collector or SCA. The box 528 can connect to the collector controller 515 via a DB9 connector in some implementations.

In certain embodiments, the collector controller 515 has several modes, some of which include a position mode, a stow mode, a virtual track mode, a follow mode, a manual mode, and a freeze mode. The position mode can be entered when the collector controller 515 is given a position command (e.g., from any of the devices 524, 526, 528). In response to the position command, the collector controller 515 can drive one or more collectors to a desired position. The stow mode can be given when the collector controller 515 is given a stow command (e.g., from any of the devices 524, 526, 528), causing the collector controller 515 to drive one or more collectors to a predefined stow position.

The virtual track mode can also be reached when the collector controller 515 is given a stow command (e.g., from any of the devices 524, 526, 528). This mode causes the collector controller 515 to drive one or more collectors to a positioned based at least in part on a calculated sun angle. When the position is reached, the collector controller 515 can enter a wait cycle and monitor the position of the inclinometer 512 relative to the calculated sun angle. When these angles differ by a virtual track deadband value, the collector controller 515 can drive the low speed motor 518 until the one or more collectors move past a hysteresis value. The virtual track deadband value and hysteresis value are described below with respect to FIGS. 6 and 7.

The virtual track mode can continue until the sun angle has reached beyond a certain value, such as 170 degrees, or until an alarm condition occurs or the collector controller 515 receives a command to stop virtual tracking. Alarms are described in greater detail below.

The follow mode can occur in response to a follow command from any of the devices 524, 526, 528. In addition, the follow mode can occur in response to the collector controller 515 detecting an over temperature condition from the thermocouple 510. When in follow mode, the collector controller 515 can cause the one or more collectors to track behind the sun angle by an offset degree amount. The collector controller 515 can monitor the temperature detected by the thermocouple 510 until the temperature has dropped below a safe level, at which time the collector controller 515 can reenter virtual track mode.

The manual mode can be entered by direct command of an operator or by plugging a technician box 528 into the collector controller 515. Manual mode can cause the collector controller 515 to ignore inputs from the solar field control system 524 and/or the local computer system 526. This mode allows maintenance to be performed on an SCA.

The collector controller 515 can enter freeze mode by direct command from an operator in response to detecting a freeze alarm condition. A freeze alarm condition can occur when the collector controller 515 determines that the temperature output of the thermocouple 510 is below a threshold value. Below the threshold value, the heat transfer fluid in the pipes (e.g., the pipes 450) can freeze. In response to entering freeze mode, the collector controller 515 can stop movement of one or more collectors to reduce the risk of frozen heat transfer fluid damaging the pipes.

In addition to the modes described above, the collector controller 515 can include one or more alarm conditions. Example alarm conditions include motor alarms, an over temperature alarm, a freeze alarm, and a bad thermocouple alarm. A motor alarm can be triggered when one or both of the motors 516, 518 are commanded to move but the collector controller 515 does not sense movement from one or both motors 516, 518. The over temperature alarm can occur when the thermocouple 510 temperature exceeds a rated temperature value. The freeze alarm is described above.

The bad thermocouple alarm can occur if the collector controller 515 detects a bad thermocouple 510. In the case of a bad thermocouple, an operator can decide to stow one or more collectors. Instead, in some embodiments, the operator can advantageously allow the solar field control system 524 to estimate a temperature for an SCA based at least partly on temperatures of adjacent or surrounding SCAs. For example, the solar field control system 524 could estimate the temperature of the SCA by average temperatures of adjacent or surrounding SCAs. The solar field control system 524 could impute over temperature and freeze alarms for the adjacent or surrounding SCAs to the SCA with the bad thermocouple.

IV. Virtual Sun Tracking

Figure 6:
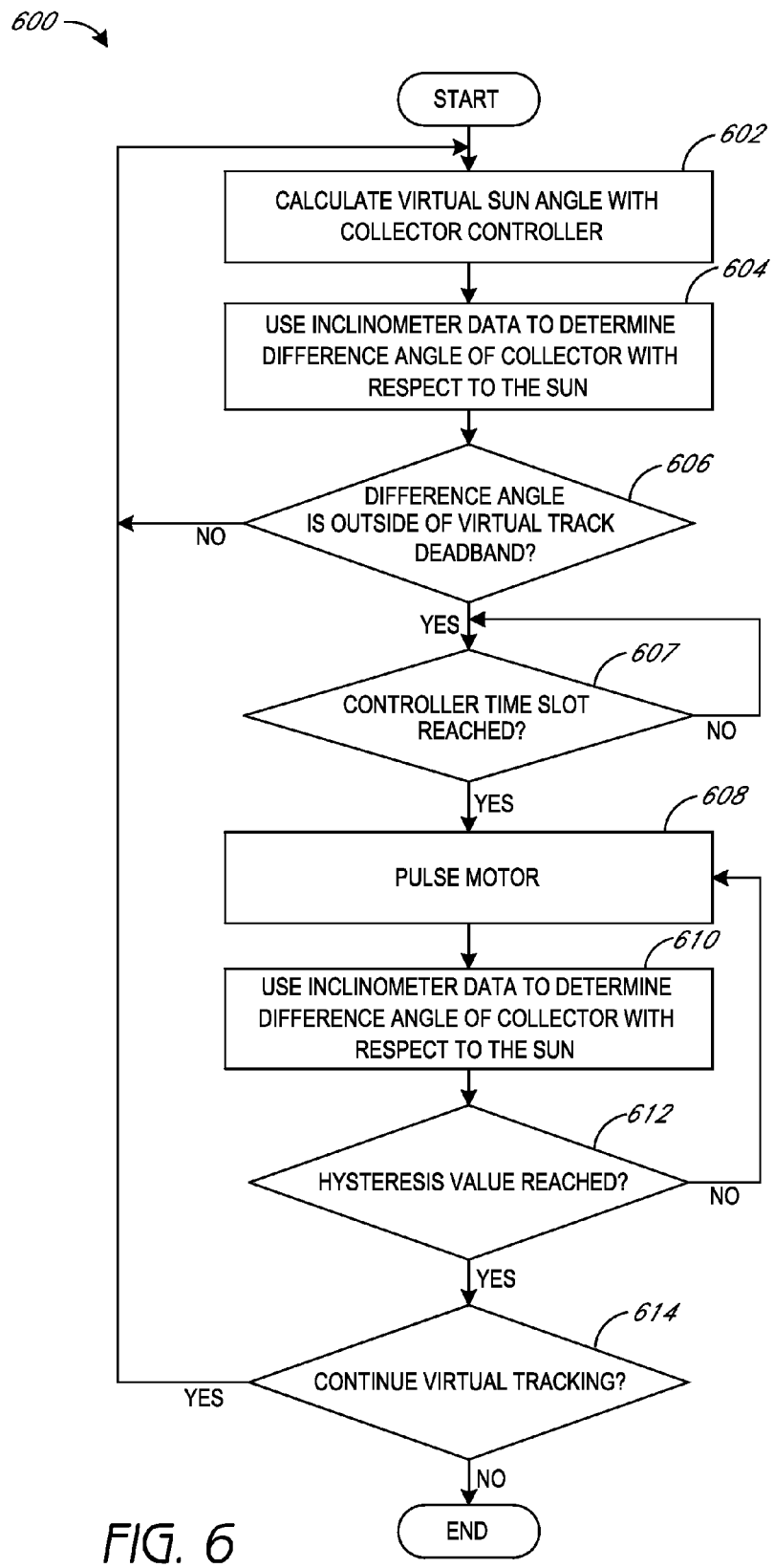
FIG. 6 illustrates an embodiment of a virtual tracking process for providing hysteresis when performing virtual sun tracking with the collector controller of FIG. 5.

FIG. 6 illustrates an embodiment of a virtual tracking process 600 for providing hysteresis when performing virtual sun tracking. The virtual tracking process 600 can be performed by any of the collector controllers described above. Advantageously, in certain embodiments, the virtual tracking process 600 can reduce collector jitter.

Figure 7A:
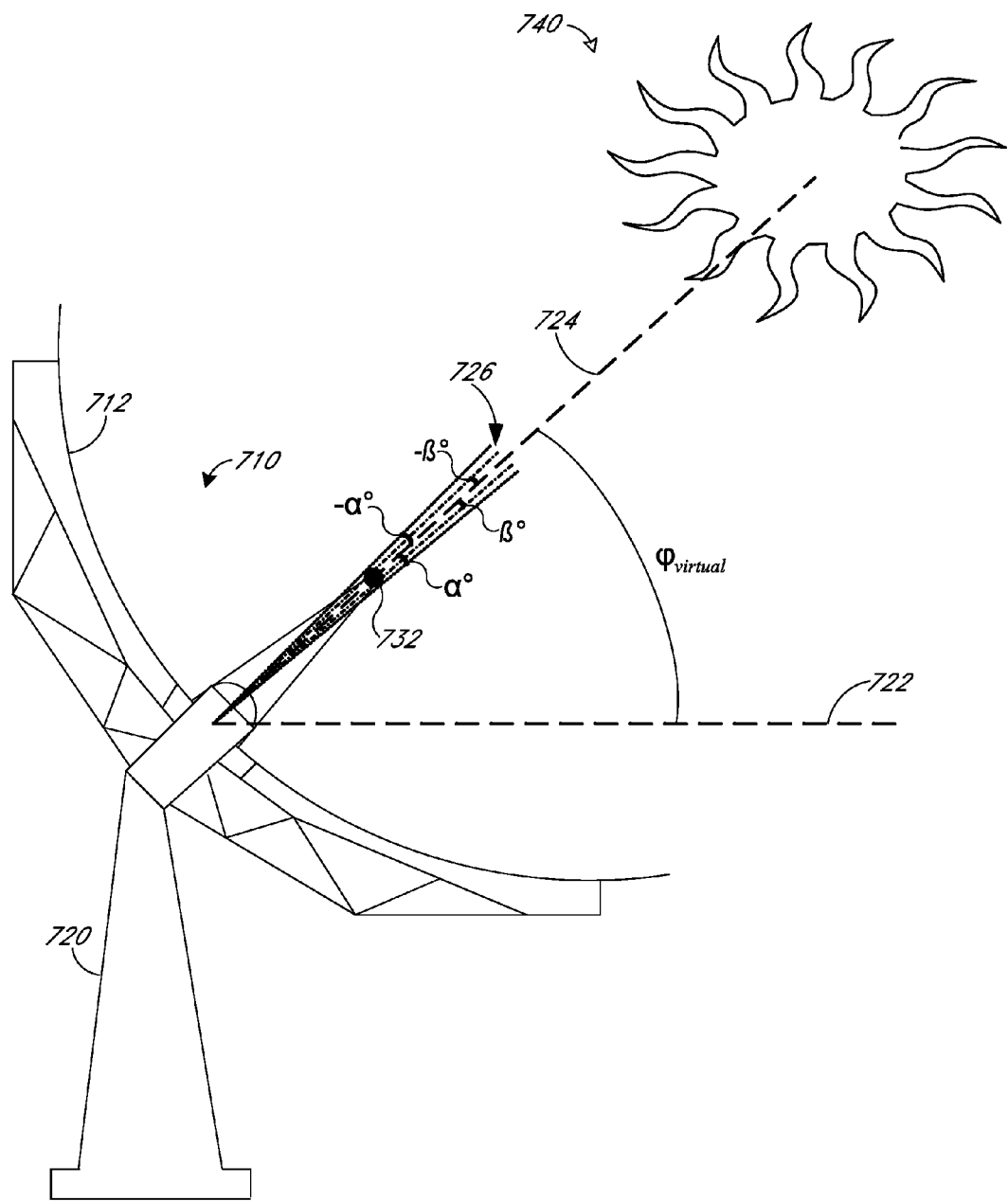
FIG. 7A illustrates an example virtual track deadband with respect to a solar collector.

At block 602, a virtual sun angle is calculated by the collector controller. An example of a virtual sun angle $\phi_{virtual}$ is shown in FIG. 7A. In FIG. 7A, a side view of a collector 710 is shown. The collector 710 includes a mirrored surface 712, a pylon 720, and a heat transfer pipe 732. The collector 710 is shown properly aligned with the sun 740. In certain embodiments, the virtual sun angle, $\phi_{virtual}$, can be the angle between a horizon 722 and a calculated sun position with respect to the collector 710 along a line 724 normal to the mirrored surface 712. The virtual sun angle can be calculated in a variety of ways with any publicly available algorithm.

Referring again to FIG. 6, inclinometer data is used at block 604 to determine a difference angle of the collector with respect to the sun. In this block, the inclinometer angle could be subtracted from the virtual sun angle (or vice versa) to determine a difference between the two angles. At block 606, it is determined whether the difference angle is outside of a virtual track deadband. Referring again to FIG. 7A, an example virtual track deadband 726 is shown. The virtual track deadband (VTDB) 726 can be an angular band centered on the line 724 (see also FIG. 7B).

As described above, when the collector 710 is properly aligned with the sun 740, rays from the sun 740 are focused by the mirrored surface 712 onto the heat transfer pipe 732. The pipe 732 is normal or substantially normal to the mirrored surface 712 in some embodiments. Thus, in certain embodiments, the pipe 732 should be aligned directly with the sun 740 in order for the mirrored surface 712 to be properly aligned with the sun, as is shown in FIG. 7A. In order for the pipe 732 to receive an increased or optimized amount of energy from the sun 740, in certain embodiments the collector controller attempts to keep the difference angle and therefore the pipe 732 within the VTDB 726.

Figure 7B:
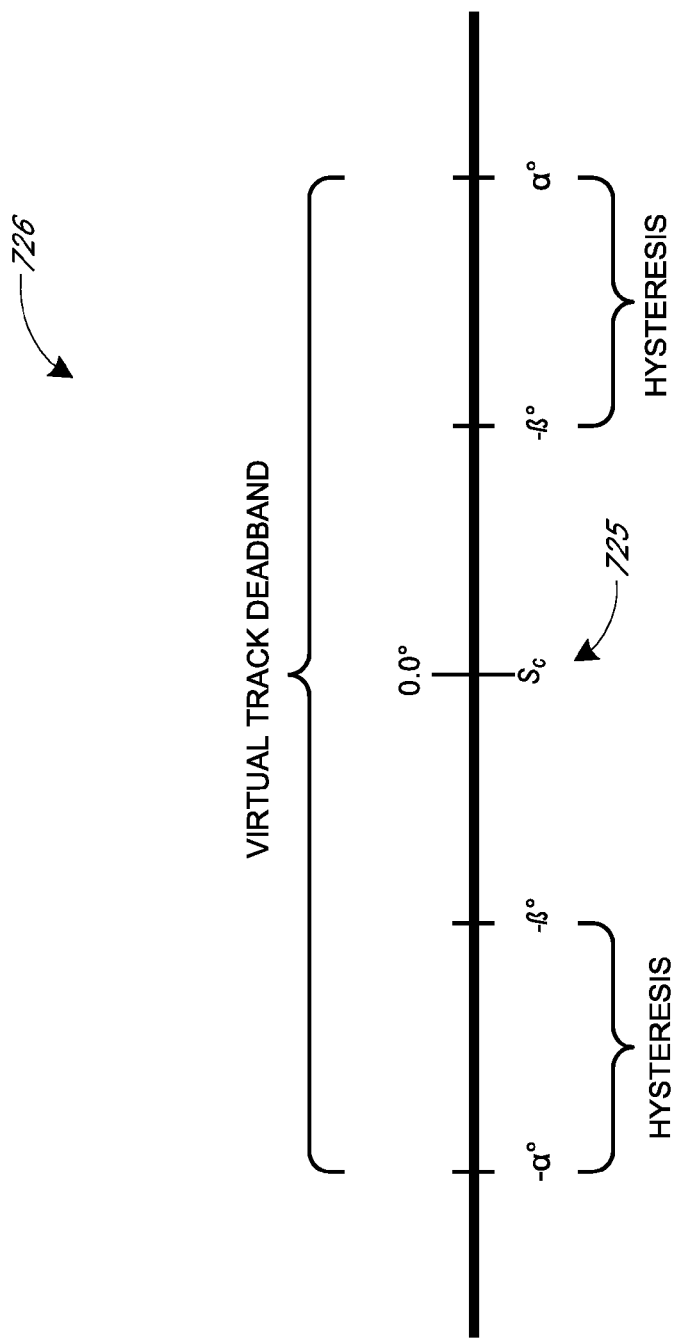
FIG. 7B illustrates another embodiment of the virtual track deadband associated of FIG. 7B.

In certain embodiments, the VTDB 726 has an angular width that corresponds to the width of the pipe 732. The width of the VTDB 726 can range from $-\alpha°$ to $\alpha°$ in the depicted embodiment. A more abstract view of the VTDB 726 is shown in FIG. 7B. In FIG. 7B, the VTDB 726 includes a sun crossing point $S_c$ 725 corresponding to the line 724 in FIG. 7A. The value of this sun crossing point 725 is 0°, representing zero difference between the inclinometer angle and virtual sun angle. The values $-\alpha°$ and $\alpha°$ delimit the VTDB 726. These values can be determined by the size of the pipe 732. In one implementation, for example, the width of the pipe could correspond to about 0.015 degrees, resulting in values of about $-0.075$ degrees for $-\alpha$ and about $+0.075$ degrees for $\alpha$.

Referring again to FIG. 6, if the difference angle is outside the VTDB, or equivalently in certain embodiments, if the center of the pipe is outside the VTDB, it is further determined at block 607 whether a time slot has been reached for the collector controller. In certain embodiments, collector controllers are assigned time slots in which to make collector movements when tracking the sun. By having time slots in which collectors can move, power drawn by collector motors can be staged so as to reduce a load on a UPS (such as the UPS 170).

The time slots to which collectors can be assigned can be determined by a group ID assigned to each collector. For example, the solar site can be divided into a number of groups, to which several collector controllers are assigned (see also FIGS. 11 and 12). Each group can be assigned a specific time slot in which to move. In some implementations, collectors can move once every several seconds or so. Thus, if the solar site were divided into several groups, the time slots might be on the order of a few seconds. In other embodiments, the time slots can be of shorter or longer duration. In still other embodiments, time slots are not used and collectors are allowed to move at any time.

If the time slot has not been reached for a particular collector controller, the process 600 loops back to block 607, effectively waiting until the time slot has been reached. Otherwise, a motor is pulsed at block 608. This motor can be the low-speed motor described above. Pulsing the motor can move the collector back within the VTDB. At block 610, the inclinometer data is used again to determine the difference angle of the collector with respect to the sun.

In currently available systems, if the difference angle is within the VTDB, the motor would not be pulsed further. However, if the difference angle is just barely within the VTDB, the wind could move the collector such that the difference angle is outside of the VTDB, causing the motor to turn on again. Repetition of this cycle can be referred to as collector jitter. In contrast, the process 600 can reduce or prevent this jitter as follows. At block 612, it is determined whether a hysteresis value has been reached. This hysteresis value can be a smaller angle value than the limits of the VTDB. Referring to both FIGS. 7A and 7B, the values $\pm\beta°$ are the hysteresis values. In embodiments where the VTDB is about 0.015° wide, the hysteresis values might occur at about $\pm0.036°$. However, these values can vary widely in certain embodiments.

If the hysteresis value has not been reached, the motor is pulsed again at block 608, causing blocks 608, 610, and 612 to be repeated again until the hysteresis value is reached. Once the hysteresis value is reached, the collector (or rather, the difference angle) can be far enough into the VTDB to reduce collector jitter. Thus, at block 614 it is determined whether to continue virtual tracking. If so, the process 600 loops back to block 602; otherwise, the process 600 ends.

Although the virtual tracking process 600 has been described in the context of virtual sun angles, the features of the process 600 can also be applied if sun sensors are used to estimate the sun angle.

V. Solar Field Control System Overview

Figure 8:
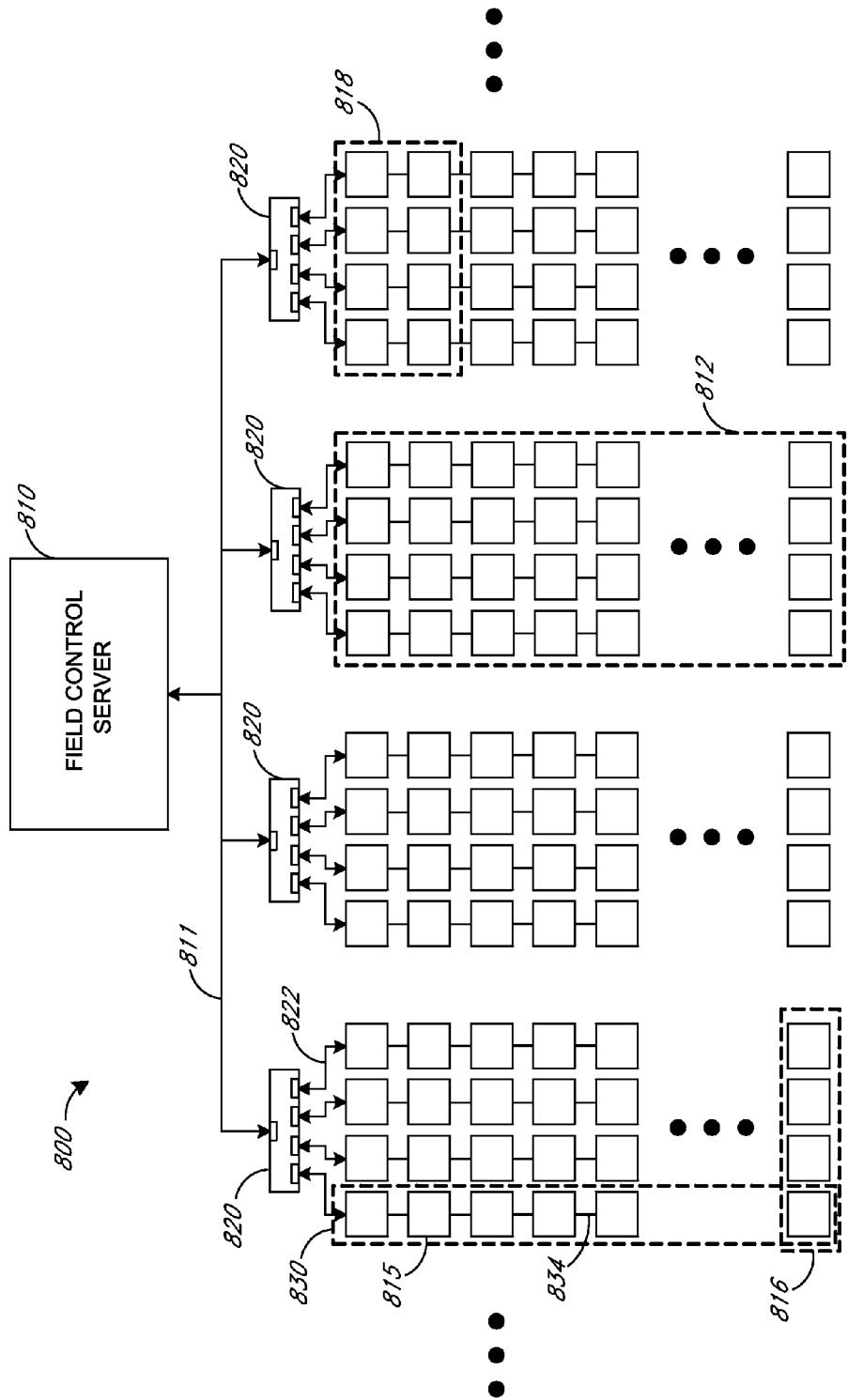
FIG. 8 illustrates an embodiment of a network of collector controllers.

FIG. 8 illustrates an embodiment of a network 800 of collector controllers 815. The collector controllers 815 can be example implementations of the collector controllers 415, 515 described above. Each of the collector controllers 815 can be part of an SCA along with one or more collectors (see, e.g., FIG. 1). The collector controllers 815 are controlled by a field control server 810, which can implement the solar field control systems 152, 524 described above (see FIG. 9). Advantageously, in certain embodiments, the network 800 is designed to be scalable, so that upgrades of the solar site 100 can be performed efficiently and cost-effectively.

The field control server 810 can include one or more physical computer servers. The field control server 810 can be programmed with instructions for monitoring and controlling collectors via the collector controllers 815. In certain embodiments, the field control server 810 provides one or more user interfaces for an operator to monitor and control the collectors. Examples of these user interfaces are described below with respect to FIGS. 15 through 32.

In the depicted embodiment, the field control server 810 is connected to a plurality of serial servers 820 with Ethernet cabling 811. The Ethernet cabling 811 can include wires, fiber, combinations of the same, or the like. The field control server 810 can communicate with the serial servers 820 using TCP/IP or UDP/IP protocols. Each serial server 820 can have an IP address that is addressable by the field control server 810.

The serial servers 820 connect to channels 830 of collector controllers 815. Four channels 830 per serial server 820 are shown in the depicted embodiment. Each channel 830 can include a plurality of collector controllers 815 that share a common serial bus 834 such as a multi-drop bus. The collector controllers 815 could also be connected in a daisy-chain configuration. The collector controllers 815 in a given channel can communicate with a serial server 820 over the channel 830 via a serial interface, such as an RS 485 interface. In certain embodiments, the serial servers 820 therefore act as IP to serial bridges.

Several collector controllers 815 can be included in a channel 830. Advantageously, in certain embodiments, a channel 830 can be expanded by adding more collector controllers to the bus 834. Likewise, additional serial servers 820 can be provided to expand the number of collector controllers and therefore collectors.

The collector controllers 815 can also be logically grouped into rows 816, loops 818, and fields 812 based at least partly on the configuration of collectors in the solar site. For example, a row 116 of collectors 114 (see FIG. 1) can have an associated row 816 of collector controllers 815, a loop 118 of collectors 114 can include a loop 818 of collector controllers 815, and so on. In certain embodiments, the field control server 810 can enable an operator to send commands to or request data from any subgroup of the collectors 815, including for example one or more collector controllers 815, one or more rows of collector controllers 816, one or more loops 818 of collector controllers, one or more fields of collector controllers 812, and all of the collector controllers 815. User interfaces and optimizations for controlling different subgroups of the collectors 815 are described below.

Many alternatives for the structure shown in the network 800 could be used. For instance, Ethernet cabling 811 could be run directly from the field control server 810 to the collector controllers 830. Conversely, RS 485 or other serial cabling could connect the collector controllers 830 directly to the field control server 810. In another embodiment, the field control server 810 can communicate wirelessly with the serial servers 820 or with the collector controllers 815. Any combination of these and other networking technologies can be used to control the collector controllers 815.

Figure 9:
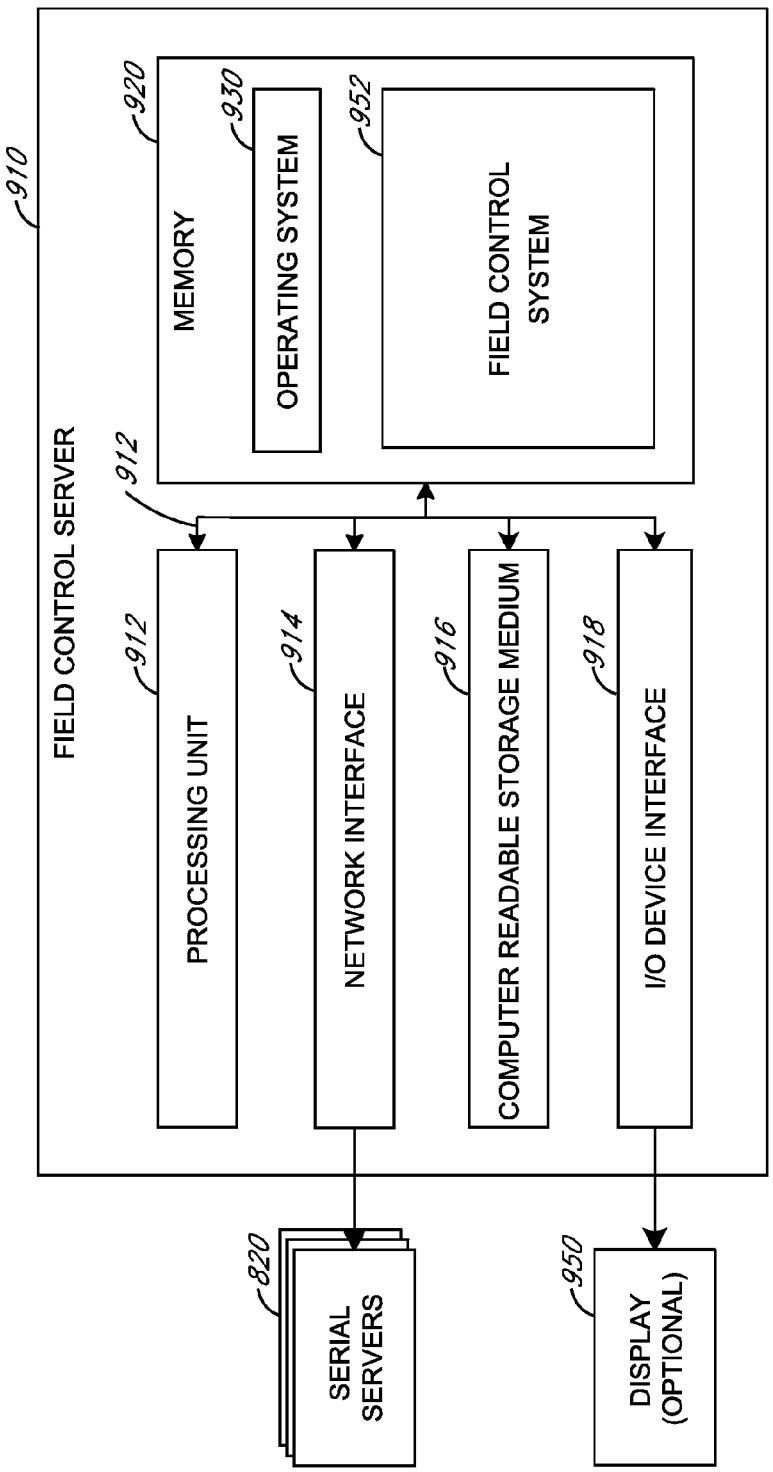
FIG. 9 illustrates an embodiment of a field control server for controlling the collector controllers of FIG. 8.

FIG. 9 illustrates an embodiment of a field control server 910 for controlling any of the collector controllers described above, including the controllers 415, 515, and 815. The field control server 910 is an example implementation of the field control server 810 of FIG. 8.

The general architecture of the example field control server 910 shown includes an arrangement of computer hardware and software components that can be used to implement a field control system 952. The field control system 952 can be an implementation of the field control systems 152, 524 described above. As illustrated in FIG. 9, the field control server 910 includes a processing unit 912, a network interface 914, a computer readable storage medium 916, and an input/output (I/O) interface 918, all of which can communicate with one another by way of a communication bus 919.

The network interface 914 can include a network interface card or the like that provides connectivity to a collector controller network, such as the network 800 of FIG. 8. The network interface 914 can be connected to the serial servers 820, for instance. The processing unit 912 can include one or more processors that process information from the collector controller network and that send commands over the network interface 914 to collector controllers. The processing unit 912 can also communicate to and from a memory 920 and further provide output information for an optional display 950 via the I/O device interface 918. The display 950 can be directly connected to the field control server 910; alternatively, an operator computer system having a display could connect to the field control server 910 via the network interface 914. The field control server 910 can include many more or fewer components than those shown in FIG. 9.

The memory 920 can include RAM, ROM, and/or other persistent memory that contains computer program instructions that the processing unit 912 executes in order to operate the field control system 952. The memory 920 can store an operating system 930 that provides computer program instructions for use by the processing unit 912 in the general administration and operation of the field control system 952. In certain embodiments, the field control server 910 is therefore a special-purpose computer programmed to implement the field control system 952.

Figure 10:
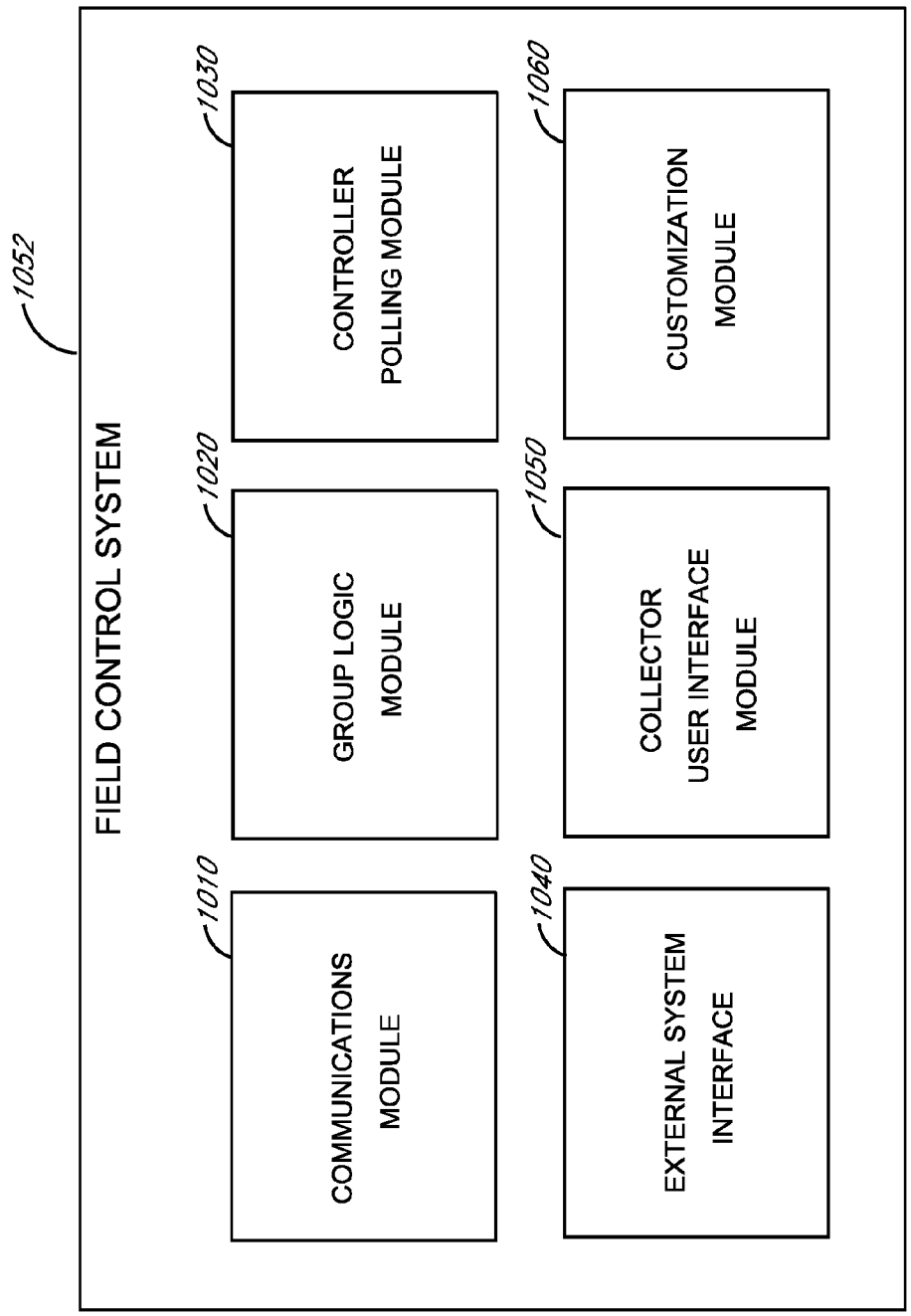
FIG. 10 illustrates an embodiment of a field control system that can be implemented by the field control server of FIG. 9.

FIG. 10 illustrates an embodiment of a field control system (FCS) 1052. The field control system 1052 is an example implementation of the field control system 940 of FIG. 9 and can include some or all of the features of the field control systems 152, 524 described above. In the depicted embodiment, the FCS 1052 includes modules that represent logical groupings of functionality. Each of the modules can include hardware and/or software for performing specific functions.

More or fewer modules can be included in certain implementations of an FCS. In certain embodiments, the FCS 1052 is programmed using an object-oriented platform to promote scalability, such as the NET platform. Advantageously, certain of the modules shown can contribute to the scalability of the solar plant 100. Other advantageous features can also be provided by the FCS 1052.

By way of summary, the depicted embodiment of the FCS 1052 includes a communications module 1010 that can manage communications between the FCS 1052 and the collector controllers. Advantageously, in certain embodiments, the communications module 1010 can use a scalable custom protocol for communicating with the collector controllers. A group logic module 1020 of the FCS 1052 can also use the custom protocol to stage commands to the command controllers so as to reduce the amount of power consumed by the controllers at once. The functions of the group logic module 1020 can advantageously facilitate employing a reduced size of an uninterruptible power supply, such as the UPS 170.

A controller polling module 1030 can perform one or more processes for polling collector controllers for data. Advantageously, in certain embodiments, the controller polling module 1030 can use multiple threads of execution to access data from the collector controllers. An external system interface 1040 can receive or obtain information from a rankine and/or power generation system (see FIGS. 1 through 3). This information can be used by the FCS 1052 to determine whether to shut down or otherwise reduce production of the solar site for safety reasons.

A collector user interface module 1050 can provide an operator of the FCS 1052 with access to collector status, collector controller status, commands, and other features related to operation of the solar site. A customization module 1060 can provide a customization user interface for customizing the collector user interface module 1050. The customization user interface can also enable an operator to customize network settings, such as device addresses, device configurations, and the like. Moreover, the customization user interface provided by the customization module 1060 can allow customization of collector controller commands.

VI. Collector Controller Communications

Figure 11:
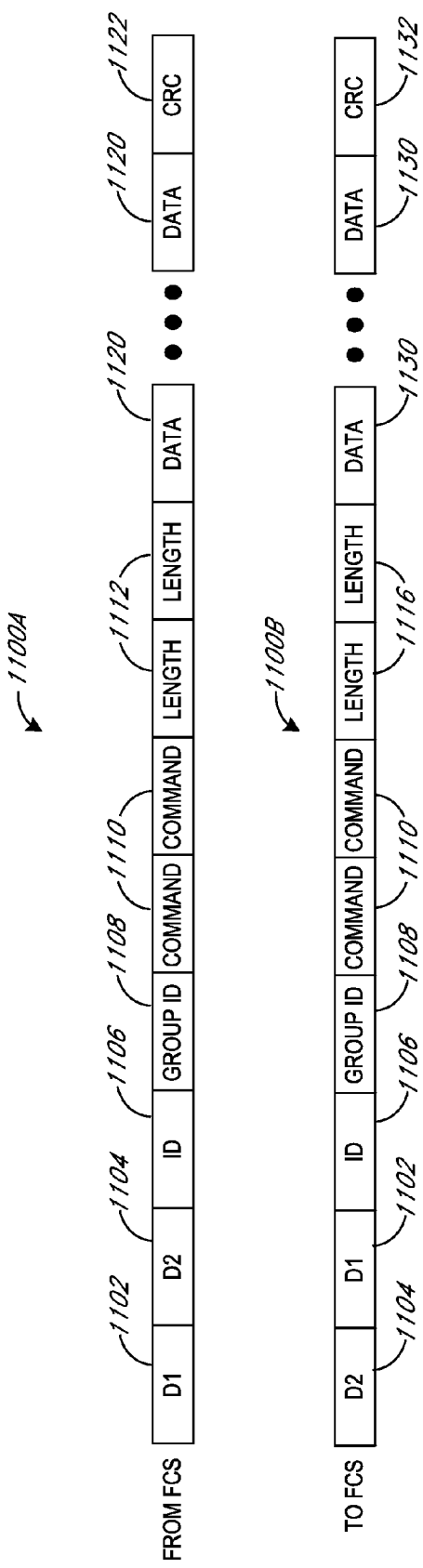
FIG. 11 illustrates example data packets that can be sent to and from collector controllers.

The custom communications protocol of the communications module 1010 can employ variable-length data packets. FIG. 11 illustrates example variable-length data packets 1100A, 11006 that can be used by the communications module 1010 to communicate to and from the collector controllers. The data packet 1100A is an example of a data packet that could be sent from the FCS 1052 to one or more collector controllers. The data packet 1100B is an example of a data packet that could be sent from a collector controller to the FCS 1052.

Each of the packets 1100A, 11006 is divided into several segments. These segments can include bits, bytes, or multiple bits or bytes. Each of the packets 1100A, 1100B includes direction segments 1102, 1104. These direction segments 1102, 1104 are advantageously reversed between the packets 1100A, 1100B in the depicted embodiment. This reversal of direction segments 1102, 1104 can indicate to devices on the network whether a packet 1100A, 11006 is coming from the FCS 1052 or is being sent to the FCS 1052. Using direction segments 1102, 1104 in this manner can reduce or prevent collector controllers from mistakenly accepting packets intended for the FCS 1052.

Each of the packets 1100A, 1100B also includes an ID segment 1106 that identifies the collector controller to which the packet is addressed (for the packet 1100A) or from which collector controller the packet was sent (for the packet 1100B). This ID, in certain embodiments, identifies a collector controller by number and channel (see FIG. 8). The collector controllers could be numbered, for instance, 1 through n (where n is an integer). Letters could be assigned to channels. Thus, the ID for an example controller could be 15A (the 15th controller in channel A). In the data packets 1100A, 11006, the ID could be represented using ASCII hexadecimal or binary values.

Similar to the ID segment 1106, each packet 1100A, 1100B also includes group ID segments 1108. The group ID segments 1108 can identify a group to which a collector controller belongs. The group IDs can be used to stage commands to a solar site so as to avoid excessive draw on a UPS. Example logic for staging commands is described below with respect to FIG. 12.

Each packet 1100A, 1100B also includes two command segments 1110 in the depicted embodiment. The command segments 1110 in the packet 1100A can include a command sent from the FCS 1052 to a collector controller. The command segments 1110 in the packet 11006 can also include a copy of the command that was received from the FCS 1052 so that data included in the packet 11006 can be associated with the command. The command segments in the packet 11006 sent to the FCS 1052 can be omitted in some embodiments.

The packets 1100A, 1100B also include length segments 1112, 1130 that can identify a length of the packets 1100A, 11006 and cyclic redundancy check (CRC) segments 1122, 1132 that can be used to error-check the packets 1100A, 11006. The packets 1100A, 11006 also include data segments 1120, 1130. The data segments 1120, 1130 can include data associated with the command received from the FCS 1052. This data can include parameters associated with the command for the packet 1100A and can include data obtained or generated by the collector controller for the packet 11006. For example, if the packet 1100A from the FCS 1052 includes a command to move a motor, the data segments 1120 can include one or more values for how far to move the motor. If the packet 1100A includes a command to obtain a thermocouple reading, the data segments 1130 of the packet 11006 can include values corresponding to the thermocouple reading.

In certain embodiments, the collector controllers can send data packets to the FCS without receiving a command. For example, the collector controllers could periodically report sensor readings, collector controller status information, alarms, and the like without prompting from the FCS. In these circumstances, the packets 11006 sent by collector controllers might not include command segments 1110.

Advantageously, in certain embodiments, there can be any number or substantially any number of data segments 1120, 1130. Thus, the length of the data packets 1100A, 1100B can be variable. In one embodiment, the size of the data segments 1120, 1130 can be, for example, as high as 65 kilobytes or more. The communications protocol employed by the communications module 1010 of the FCS 1052 can therefore differ significantly from communications protocols used by other solar plants, which typically use fixed packet lengths. Allowing a variable amount of data to be included in the packets 1100A, 11006 can advantageously enable additional amounts of data to be provided to and from the FCS 1052. Thus, new commands can be created that use more or less data than existing commands and existing commands can be upgraded to use more or less data. As a result, the communications protocol employed by the FCS 1052 can be a scalable protocol that promotes scalability and upgradability of the solar plant.

In other embodiments, the data segments 1120 or 1130 of one of the packets 1100A or 1100B can be fixed in length. In addition, in some embodiments, the command segments 1110 can be variable length, and other segments of the packets 1100A, 11006 can be variable length. Moreover, certain of the segments of the packets 1100A, 11006 shown can not be used in some embodiments while other or additional segments can be used in other embodiments. In addition, some or all segments of the packets 1100A, 11006 other than the data segments 1120, 1130 can be considered a header segment or segments in certain embodiments. In addition, each set of data segments 1120, 1130 can be referred to collectively as a data segment in certain embodiments.

Figure 12:
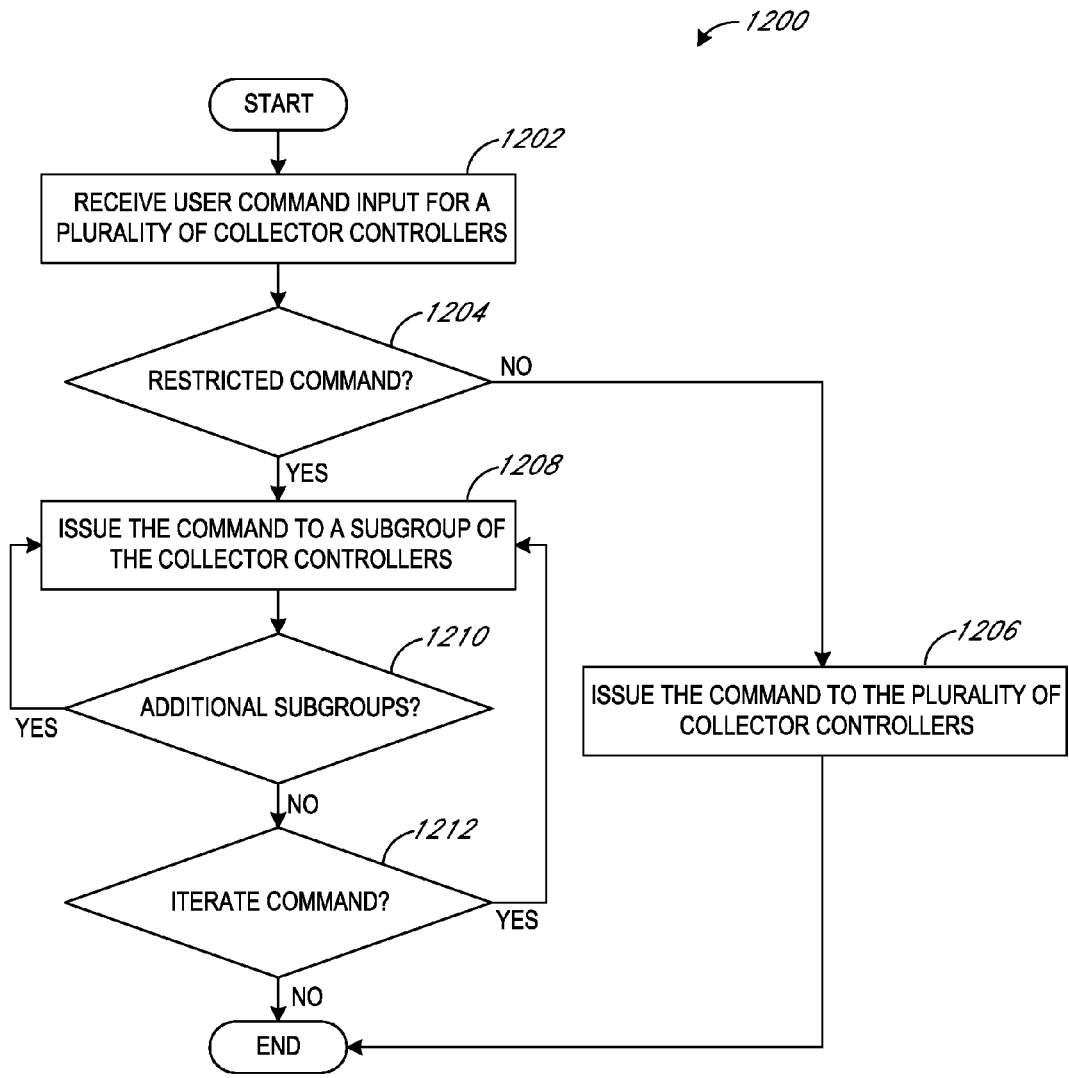
FIG. 12 illustrates a process for controlling a plurality of collector controllers.

Referring to FIG. 12, the group logic module 1020 can perform a process 1200 for staging commands to groups of collector controllers. The process 1200 can also be performed by any of the field control servers or field control systems described above. Advantageously, in certain embodiments, the process 1200 can facilitate controlling groups of collector controllers to reduce power draw from a UPS during a given time frame. The process 1200 can use the group ID segment of the data packets 1100 of FIG. 11 to perform this functionality.

Power draw can be high on a UPS when inductive devices such as motors power on. When a motor turns on, an inrush of current can occur, which can draw a significant amount of power from the UPS. If the UPS were to be rated to cover motor inrush for most or all of the collector controllers at once, the UPS might be much more expensive than a lower-rated UPS. Thus, in certain embodiments, staging motor commands (and possibly lock and other commands) to the collector controllers via the process 1200 can allow a less expensive UPS to be used that has smaller capacity. Also, the process 1200 can facilitate using cables at the solar site that is rated for lower power amounts, which can also reduce costs.

At block 1202, a user command input can be received for a plurality of collector controllers. The command input can be received, for example, from an operator of the FCS 1052. At decision block 1204, it is determined whether the command is a restricted command. Restricted commands can be commands that control motors (e.g., high-speed motors), locks, and the like. Examples of restricted commands might include commands to perform bulk movements on collectors such as emergency stop commands and stow commands. These and other commands can be restricted because they can consume large amounts of power at one time.

If the command is not restricted, the command can be issued to the plurality of collector controllers at block 1206, and the process 1200 ends. For instance, a command to obtain data from thermocouples sent to a plurality of controllers might cause relatively little power draw and therefore can be safe to run on a lower-rated UPS. However, if the command is a restricted command, the command is issued to a subgroup of the collector controllers at block 1208. In one embodiment, the subgroup can include collector controllers that have a common group ID (see FIG. 11). Collector controllers can be assigned in groups by one or more individual collectors, rows, loops, fields, or a subset thereof.

In one embodiment, the FCS 1052 broadcasts a command to all the collector controllers in the solar field. The broadcast packet or packets sent by the FCS 1052 can identify one or more groups to which the command is directed. For example, an operator can broadcast a position command to "group 1" via a user interface of the FCS 1052 (see FIG. 15). This command can cause the FCS 1052 to broadcast a packet with a group ID of "1" (or the like) to the entire solar field. The collector controllers having a group ID of "1" can respond to the command.

In other embodiments, when the operator issues a command to a group, the FCS 1052 determines (e.g., via a lookup table or the like) which collector controllers to issue the command to. The FCS 1052 can then issue the command to those controllers, rather than to the entire solar field. Thus, group commands can be performed by broadcasting to the entire solar field or by sending targeted commands. Advantageously, in certain embodiments, broadcasting commands to the entire solar field can reduce processing resources of the FCS 1052, for example, by eliminating or reducing any lookup operations.

At block 1210 it is determined whether there are additional subgroups within the plurality of collector controllers. If there are, the process 1200 loops back to block 1208. Thus, commands can be issued to each subgroup of the plurality of collector controllers until there are no remaining subgroups.

If there are no remaining subgroups, it is further determined whether to iterate the command at block 1212. It can be desirable to iterate some commands such as commands that cause large collector movements, so that several collectors can move a short distance in a given timeframe. If large collector movement commands were not iterated, some collectors might have to wait for a significant time while other collectors finished moving. In some emergency or alarm conditions (e.g., overtemp or wind conditions), the time collectors might have to wait for other collectors to move could damage the collectors.

In contrast, using the process 1200, motors for each subgroup can be turned on for short period of time, allowing each subgroup to actuate its motors briefly. Thus, several collectors can be turned more quickly to reduce the risk of collector damage. The motor actuation command can iterate among the subgroups until a desired change in collector position has been reached. Thus, if it is determined to iterate the command at block 1212, the process 1200 can loop back to block 1208. Otherwise, the process 1200 ends.

In some embodiments, a delay can be provided between issuing commands to different subgroups. This delay can be on the order of milliseconds in one embodiment. In addition, in some embodiments, an operator can manually select groups of collector controllers to broadcast commands to. If the operator selects a group to broadcast a command to, in some implementations, the FCS 1052 can also subdivide the selected group into subgroups to iterate commands through. An operator could manually select one or more individual collectors, groups, rows, loops, fields, or all collectors.

In certain embodiments, the FCS 1052 can generate a thread of execution responsible for staging the restricted command to subgroups. The FCS 1052 can generate a separate thread responsible for monitoring status of the collector controllers within a group to determine when the command has completed execution.

Figure 13:
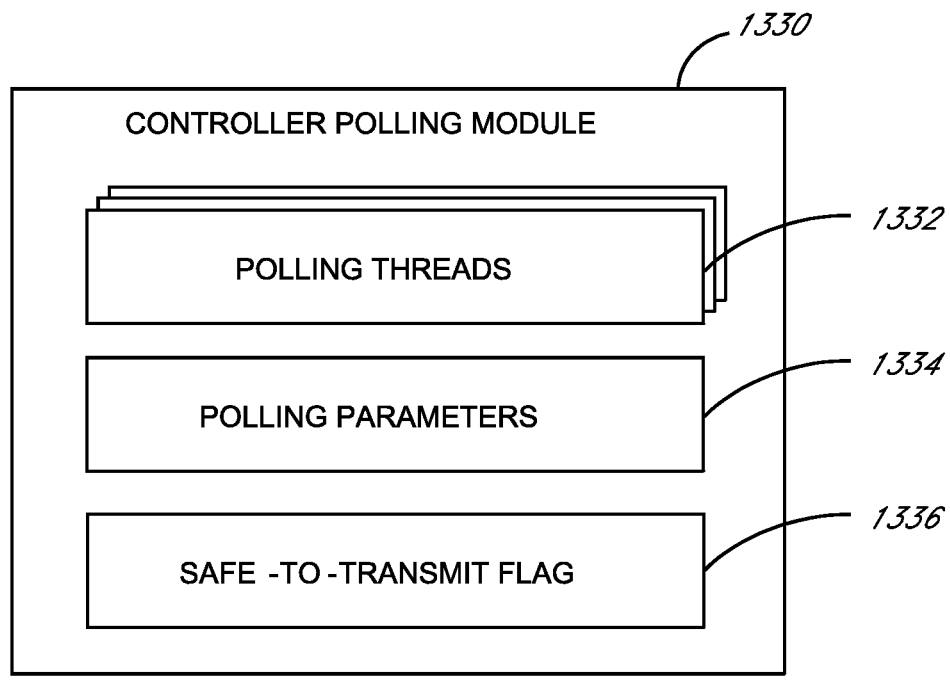
FIG. 13 illustrates an embodiment of a polling module that can be included in the field control server to poll the collector controllers.

FIG. 13 illustrates an embodiment of a controller polling module 1330 that can be implemented by the field control system 952 or 1052 to poll the collector controllers 415, 515, or 860. The controller polling module 1330 is an example implementation of the controller polling module 1030. Advantageously, in certain embodiments, the controller polling module 1330 uses multi-threading to efficiently poll collector controllers in the solar site.

In certain embodiments, the controller polling module 1330 uses a dynamic polling algorithm to iteratively collect information from some or all collector controllers in the solar site. The controller polling module 1330 can perform polling on subsets of the collector controllers. These subsets can be organized according to channel, loop, row, field, or the like. The collector polling module 1330 can create or use one or more threads of execution 1332 for each subset of collector controllers. For example, the collector polling module 1330 could use a thread 1332 for each channel. Or, the collector polling module 1330 could use two threads 1332 for each channel or subset of controllers; one thread to poll the controllers, and the other thread to receive data transmitted by the controllers. In another embodiment, the collector polling module 1330 uses yet another thread to determine whether a controller has gone offline. The controller polling module 1330 can therefore collect status of many collector controllers simultaneously or substantially simultaneously.

Advantageously, in certain embodiments, using multi-threading can enable the solar plant to be scalable. Whenever a new set of controllers is added to the plant, one or more new threads can be assigned to these controllers automatically. For example, whenever a new set of controllers is defined using any of the customization user interfaces described below, the one or more new threads can be created programmatically. Thus, multithreading can allow the field control system 952 or 1052 to be scaled up or down without changing the source code of the field control system 952 or 1052.

More generally, any new functionality can be added to the field control system 952 or 1052 via one or more additional threads. For instance, a new module of functionality can be added to the field control system 952 or 1052. This module can run by itself in a thread that is registered with a manager module (not shown) built into the field control system 952 or 1052. Thus, in certain embodiments, new functionality can be added to the field control system 952 or 1052 without rewriting the source code of the field control system 952 or 1052.

The collector polling module 1330 can execute a polling process or algorithm in each thread 1332. The polling algorithm that executes in each thread 1332 can use a dynamic approach at collecting data in order to increase or maximize data throughput through the subset of collector controllers. This dynamic approach can include polling a subsequent controller immediately or substantially immediately (e.g., as soon as possible or shortly thereafter) upon receiving data from a first polled controller. For example, the controller polling module 1330 can poll a first controller. As soon as the first controller responds, the controller polling module 1330 can proceed to the next controller, and so on. Thus, the controller polling module 1330 can poll the controllers as fast as the controllers can respond. The polling algorithm can therefore be proactive, rather than reactive. This dynamic polling approach contrasts with a more static approach, which waits a set time for each controller to respond. However, the controller polling module 1330 can wait a static time in some embodiments if a controller does not respond.

In one example implementation, the controller polling module 1330 can poll a site of collector controllers in as little as 3 or 4 seconds (based on a channel length of about 50 controllers) or faster with the dynamic polling approach. In contrast, a static approach on the same site can take 20 seconds or longer. More generally, the dynamic polling approach can reduce polling times by an order of magnitude or more in some embodiments. Time-to-poll in the solar site can advantageously scale with the number of controllers.

A dynamic polling algorithm can also be beneficial when variable-length data packets are used, such as the variable-length packets described above. Because the length of the packets can vary, the time for polling a packet can vary. Conversely, if a static polling time were used, the length of the packets might be limited to accommodate the static polling time. Thus, the dynamic polling algorithm can make variable-length data packets a viable implementation.

As mentioned above, the collector polling module 1330 can use a separate thread to determine whether a controller has gone offline. This thread can monitor a time stamp of a last data packet received from a controller. If the time stamp is not updated within a specific interval, the controller polling module 1330 can consider the controller to be offline. Using a separate thread in this manner can reduce delays and other problems associated with continually polling a controller for a response.

Because of the dynamic nature of the polling algorithm, polling parameters 1334 can be used in certain embodiments to allow adjustment depending on the situation. Some example polling parameters 1334 that can be used are as follows:

Timeout parameter: The controller polling module 1330 can use a virtual offline detection to detect which collector controllers may be offline. When the controller polling module 1330 receives status from a collector controller, a timestamp can be generated to mark when the last known status has been received. If the time between subsequent pollings of the same collector controller exceeds the timeout value (in seconds), then the collector controller (or SCA) can be presumed "offline" and can be marked as such in a user interface exposed to an operator of the FCS (see FIG. 15).

Interval parameter: This parameter 1334 can represent the number of milliseconds or other interval between subsequent calls to the polling algorithm. The polling algorithm employed by the collector polling module 1330 can use a state-machine approach to determine what to send to the solar field, such as a request for status, request for parameter, or a collector controller command.

Frequency parameter: This parameter 1334 can represent the number of times the polling algorithm employed by the collector polling module 1330 can iterate without a valid response from the one or more collector controllers before assuming a "non-responsive" condition.

In certain embodiments, when data is transmitted to the subset of collector controllers, an internal safe-to-transmit flag 1336 (or marker) is cleared (e.g., set to zero). When data is received by a subset of collector controllers, the same internal flag 1336 can be set. This flag 1336 can be used by the collector polling module 1330 to determine when it is safe for the FCS to send data to the collector controllers. When polling the solar field, the controller polling module 1330 can check the state of the flag and use an internal counter (e.g., the frequency parameter 1334) to determine how many times the polling algorithm has iterated since the last transmission. If the number of iterations is greater than the frequency parameter 1334, then the collector polling module 1330 can assume that the collector controller is non-responsive and the polling algorithm can advance to the next SCA in the subset of collector controllers.

Thus, the frequency and interval parameters 1334 can both be used to determine a window (in milliseconds) between polling adjacent SCAs. For example, with a 50 ms interval and a frequency of 2, the controller polling module 1330 might provide at most 150 ms of time before resuming to the next SCA in the subset and a minimum of 50 ms in the event that the collector controller immediately responds.

VII. Inter-Control System Communications

Figure 14:
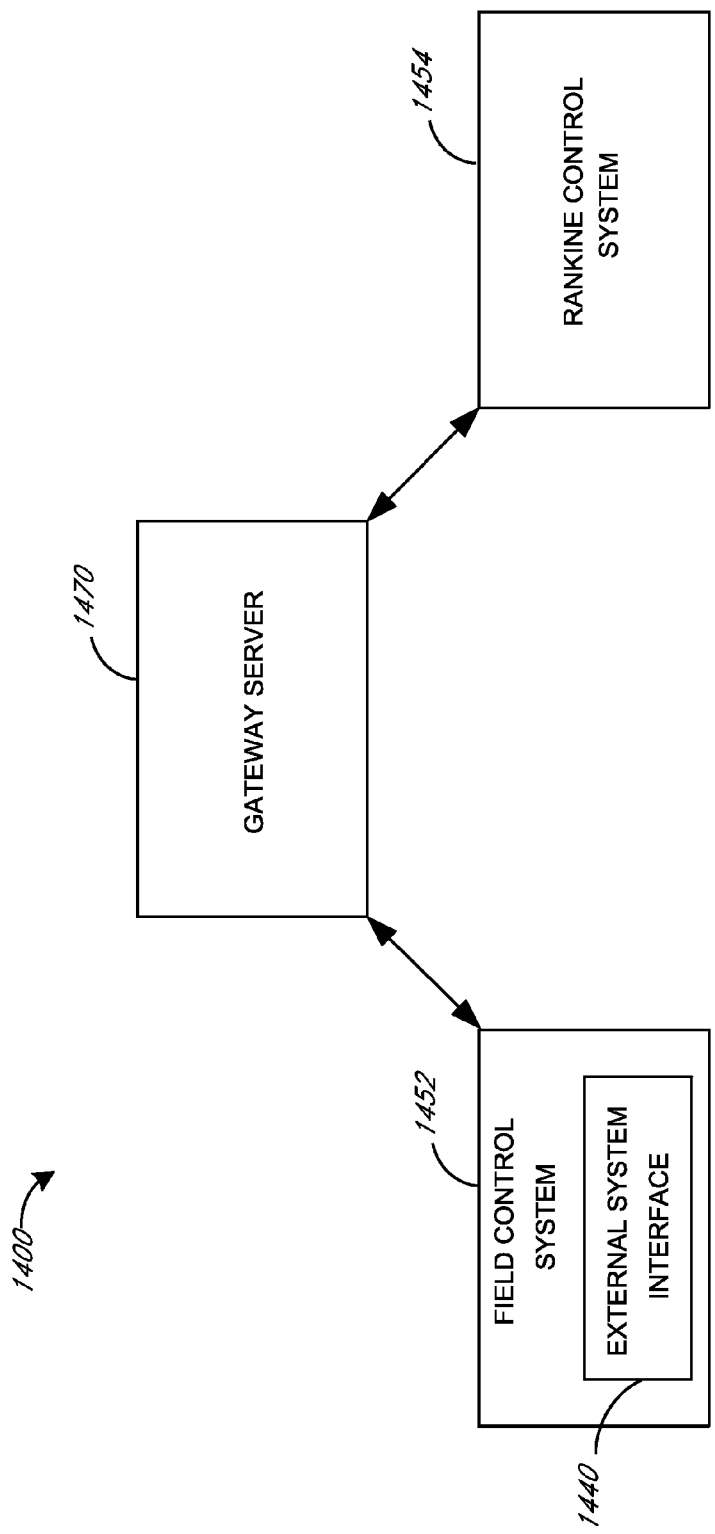
FIG. 14 illustrates an embodiment of a system for communicating between the field control server and a Rankine control system.

FIG. 14 illustrates an embodiment of a communication system 1400 for communicating between the field control system 952 or 1052 and the rankine control system described above with respect to FIG. 1. In the communication system 1400, a gateway server 1470 is provided that allows an FCS 1452 to communicate with a rankine control system 1454 and vice versa. Advantageously, in certain embodiments, the communication system 1400 can allow the ranking control system 1454 to have a degree of control over the FCS 1454, for example, for safety reasons.

The FCS 1452 includes an external system interface 1440 that is an example implementation of the external system interface 1040 of FIG. 10. The external system interface 1440 can be a client that communicates with the gateway server 1470. The external system interface 1440 can be a separate component from the FCS 1452 in some embodiments. The gateway server 1470 can use open or standardized protocols for communicating with the rankine control system 1454 or with another control system (e.g., the oil control system 156 of FIG. 1). In some embodiments, the gateway server 1470 can read parameters from the rankine control system 1454, such as parameters related to heat transfer fluid (HTF) flow, temperature, and so forth. The gateway server 1470 can forward these parameters to the FCS 1452. The external system interface 1440 can receive these parameters and determine whether to take action in the solar site based at least partly on the received parameters. For example, if the external system interface 1440 receives parameters indicating that HTF flow is low or that HTF temperature is high, the external system interface 1440 might initiate an emergency shutdown of the solar site.

In certain embodiments, the gateway server 1470 includes one or more machines programmed to abstract underlying transmission protocols into individual units. The gateway server 1470 can provide a translation mechanism to allow data between the FCS 1452 and the rankine control system 1454 to be shared in a meaningful manner.

In certain embodiments, the gateway server 1470 can run as a Microsoft Windows service and can be configurable to the operator of the FCS 1452. The gateway server 1470 can allow the FCS 1452 to communicate with third party control systems such as the rankine control system 1454 in a bi-directional manner. Because of this intended architecture, any standardized means of data communication used in the power industry can be utilized. However, in certain embodiments, the gateway server 1470 can employ OPC (Ole for Process Control) ModBus, FieldBus, or other process control technologies. The design of the external system interface 1440 can be left open to allow for easy integration of virtually any third party data protocol.

The gateway server 1470 can be configured to connect to and collect point data from the rankine control system 1454 in a read or write manner (or both). The distinction of reading and writing provides a security mechanism in certain embodiments to reduce or prevent the accidental (or deliberate) function of writing to critical points within the rankine control system 1454 or FCS 1452.

In certain embodiments, the gateway server 1470 communicates with the FCS 1452 and/or the rankine control system 1454 using XML or in another format for describing data in a structured manner. Thus, for example, a Read Item definition can command the gateway server 1470 to connect to and collect point information for a defined data tag. When a data value is updated within the rankine control system 1454, the gateway server 1470 can bundle the new data value (and an associated tag) as an XML object and transmit this value to the external system interface 1440. A Read Item might not allow writing to the data tag unless a write item has been defined for the same data tag.

A Write Item definition can command the gateway server 1470 to connect to a data point in the rankine control system 1454 and grant the ability to write information. Write Items can allow the FCS 1452 to update the underlying tag's value. It is possible to define both read and write definitions for the same point tag. Doing so can allow read/write operation. Thus, in certain embodiments, the FCS 1452 can both read and write to the rankine control system 1454 through the gateway server 1470 and vice versa.

In certain embodiments, the gateway server 1470 simplifies the hassle of data type conversion between different control systems (e.g., the FCS 1452 and the rankine control system 1454) by defaulting all data types to string values. When data traverses the gateway server 1470 (to or from the FCS system), the data can be converted or used as string data. However, some form of distinction in data types should be made in certain embodiments in order to properly write data to the rankine control system 1454. Thus, write items can have an additional field that allows mapping the write value to the following example distinct data types:

Numeric: Can include any data value that can be translated as an integer or real number.

Boolean: Can include any data value (even numeric) that can be translated as either true or false. For numeric data, any value less than or equal to zero is considered False while any value greater than zero is equal to true. For string data, any string matching "TRUE" or "FALSE" can be translated to the Boolean equivalent. Case sensitivity can be ignored.

Date/Time: Can include any Date/Time value. In addition, any string value that can be interpreted as a date/time can be recognized as a date/time value.

String: Can include any string type. String length might not be taken into consideration and it can be up to the responsibility of the external system interface 1440 to ensure that if string size limitations exist within the gateway server 1470, that they should be enforced at the external system interface 1440.

Most intrinsic data types can be simplified into these 4 categories and thus, the gateway server 1470 can provide the ability to transmit/receive some or all types of information.

For security purposes, the gateway server 1470 can use a TCP wrapper to grant/deny gateway services based on the TCP/IP protocol specification. The gateway server 1470 configuration file can provide client definitions as a TCP/IP address and port. In order for an FCS client (the external system interface 1440) to connect to the gateway server 1470, in certain embodiments its IP address should be defined within the gateway server 1470 configuration file. In addition, a data port should be defined on both the external system interface 1440 and server 1470 in certain embodiments. The gateway server 1470 can then listen for data on the defined port. The services provided by the gateway server 1470 can then be granted to (and only to) defined clients (such as the external system interface 1440) that are connected via the defined port. In this manner, only a properly configured FCS 1452 is allowed access to the gateway in certain embodiments. In addition, the data packets that traverse between client (the external system interface 1440) and the gateway server 1470 can carry a unique signature that is inclusive to the client and gateway server 1470 components. Any additional data that does not adhere to the protocol standard can be disrespectfully ignored, and an entry can be sent to the system log of the gateway server 1470.

The external system interface 1440 can be a client component or the like that is designed specifically to communicate with the gateway server 1470. When added to the FCS 1452, the external system interface 1440 client component can provide events for the FCS 1452 so that when new data has arrived from the gateway server 1470, this data can be consumed by the FCS 1452 (e.g., displayed on the screen). In addition, the external system interface 1440 client component can provide the ability to transmit data to the gateway server 1470. Provided that the gateway server 1470 has created a write definition for the tag, this data can then be written to the gateway server 1470 and thereby provide the FCS 1452 with the ability to update data in the rankine control system 1454.

Like the gateway server 1470, the external system interface 1440 can be configured specifically to define read and write items. The distinction between the two (read and write) can provide the external system interface 1440 the ability to limit write access to specific points within the FCS 1452, yet allow read access to anything defined. A Read Item definition in the external system interface 1440 can command the gateway server 1470 to raise an event if/when a read item has been received and contains a matching tag property. Read items received by the external system interface 1440 that have no defined tag within the system can be ignored. A write Item definition in the external system interface 1440 can command the gateway server 1470 to allow write operation for a given tag. If the external system interface 1440 receives a write request from the FCS 1452 and no matching write item definition exists for the tag, then the write request can be ignored.

As with the gateway server 1470, some or all data values of the external system interface 1440 can be treated as string data. It can be the responsibility of the FCS 1452 to translate the data value to the proper data type.

Function mapping between the gateway server 1470 and the external system interface 1440 can be provided to allow the FCS 1452 to respond to specific events within the rankine control system 1454. Within the FCS 1452 configuration, a mapping function or command can be provided to map specific tag names (from the rankine control system 1454) to pre-defined tags within the FCS 1452. When these tags are read and then translated as logical on/off, they can enact specific functions within the FCS 1452. Examples of such mappings or commands include:

Vtrack All: Send the solar site into Virtual Track as per "Vtrack All" within the FCS 1452.

Stow All: Send the solar field to Stow as per "Stow All" within the FCS.

Follow All: Send the solar field to Follow as per "Follow All" within the FCS. In follow mode, collectors can follow behind the sun a specified number of degrees.

Emergency Stop: Defocus the solar field during an emergency state. This mapping can be equivalent to executing an emergency stop within the FCS 1452.

Lock: Disable tracking functions within the FCS 1452 to prevent operator use. This is a safety feature to allow locking out the ability of the solar field from collecting heat because of situations that may exist in the rankine control system 1454 (e.g., lack of flow, plant trip, etc).

In certain embodiments, a user interface of the rankine control system 1454 (or oil system) can be modified to include functionality for controlling the FCS 1452. The user interface can include any of the FCS 1452 user interface functions described herein. For example, the user interface can include any subset of the commands described herein. In one embodiment, the user interface can include simplified controls for controlling the FCS 1452. A simple "emergency stop" or "panic" button, for instance, can be added to the rankine control system 1454 user interface. The entire functionality of the FCS 1452 user interface need not be implemented in some embodiments.

Much like the gateway server 1470, the external system interface 1440 component can use many of the same security features. The external system interface 1440 can be configured to provide the IP address and port number of the gateway server 1470. Communication to the gateway server 1470 can be inclusive to this address pair and thus, data originating from a different IP address source (computer) can be logged and then discarded. Likewise, a listening port can be defined within the configuration to signify which IP port number should be used for listening for gateway server 1470 data packets. When data arrives at the external system interface 1440, it should arrive at the pre-designated port in certain embodiments. Because gateway client/server data transmissions can contain a unique signature, only specific information in the correct protocol is accepted in certain embodiments. Other data transmissions can be logged and then discarded.

Thus, in certain embodiments, the gateway server 1470 architecture provides a secure or substantially secure environment to share data between the FCS 1452 and the rankine control system 1454 or other control systems via the OPC protocol or another protocol. In this manner, a tight integration between the two systems 1452, 1454 can be achieved to provide additional safety measures and control from a single console. With the open architecture, useful data can be traversed between the two systems 1452, 1454 while open architecture can provide room for expansion.

Although the gateway server 1470 has been described as a mechanism for communicating between the FCS 1452 and another system (such as the oil or rankine systems), the FCS 1452 can be more tightly integrated with another system. For instance, the FCS 1452 can be designed as part of the oil or rankine system. The FCS 1452 can also be a pluggable module to the oil or rankine system. The FCS 1452 can be a pluggable module using the OPC interface (or another interface) described above.

VIII. Customizing FCS User Interfaces

As described above with respect to FIG. 10, the collector user interface module 1050 can generate solar site control interfaces for observing and controlling a solar site. FIGS. 15 through 21 illustrate examples of such solar site control interfaces.

Figure 15:
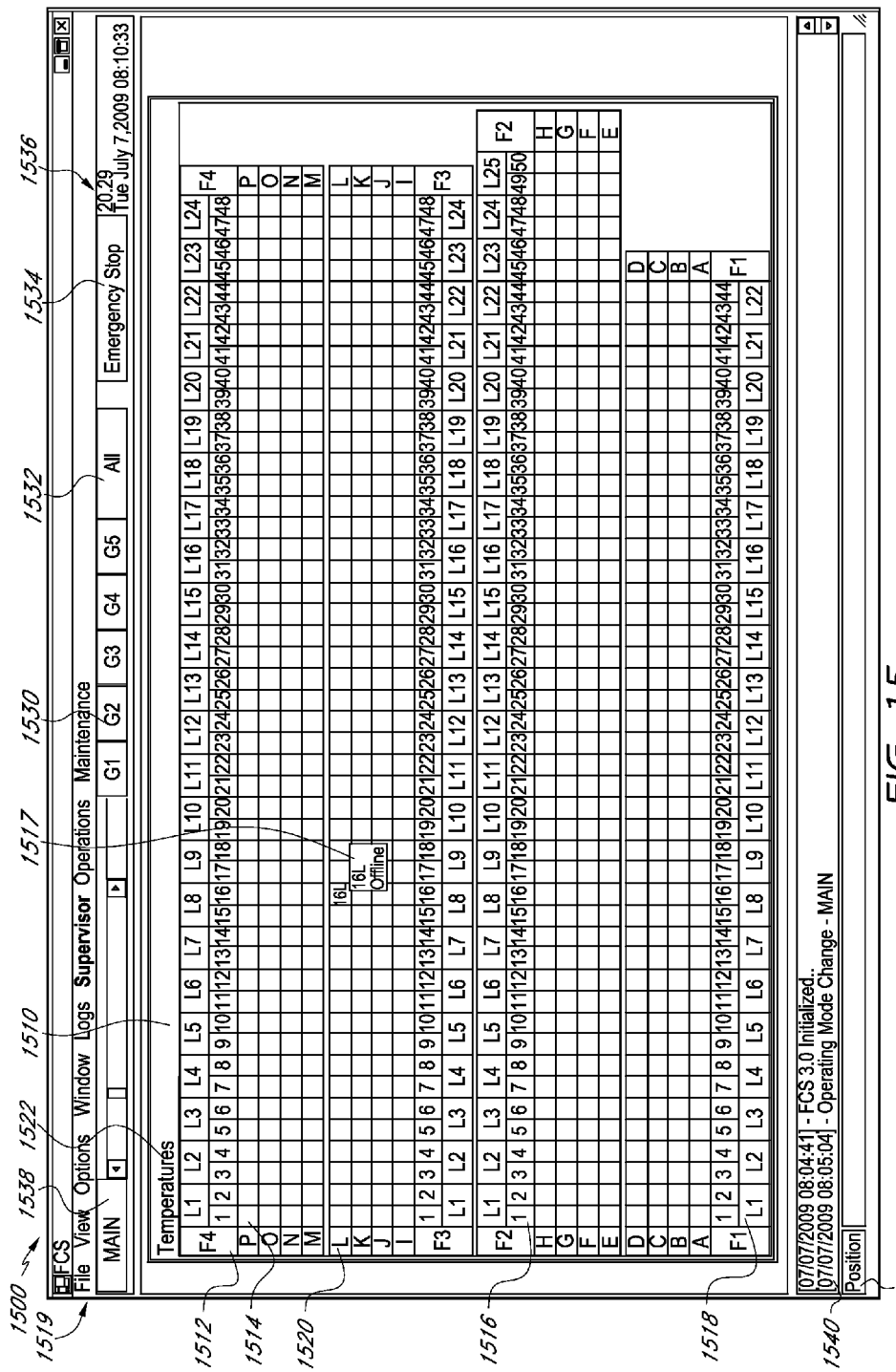

Referring specifically to FIG. 15, an embodiment of a solar site control interface 1500 is shown. The solar site control interface 1500 includes a solar site display 1510. The solar site display 1510 can be used to view the status of one or more solar fields and can be used as a portal to command the one or more solar fields. The solar site display 1510 includes one or more arrays of buttons corresponding to components of a solar site. These buttons include, in the depicted embodiment, field buttons 1512, SCA buttons 1514, row buttons 1516, loop buttons 1518, and channel buttons 1520.

The SCA buttons 1514 can provide multiple functions. The SCA buttons 1514 can display a current status of an SCA based on a current display mode. Depending on the display mode, the SCA buttons 1514 can be filled with a specific color that corresponds to a current display mode and legend. The SCA buttons 1514 can also provide movement indicators, such as arrows or the like, to indicate movement of an SCA. The SCA buttons 1514 can also provide maintenance indicators such as boxes, x's, or other indicators that depict SCAs undergoing maintenance or testing.

The SCA buttons 1514 identify SCAs by row and channel. For instance, an SCA button 1514 for an SCA in a 16th row and in a channel L can have an ID of 16L. Hovering over an SCA button 1514 can cause a tool tip 1517 to appear, which provides status on the SCA. The example tool tip 1517 shown for the SCA 16L indicates that the SCA 16L is offline.

Figure 16:
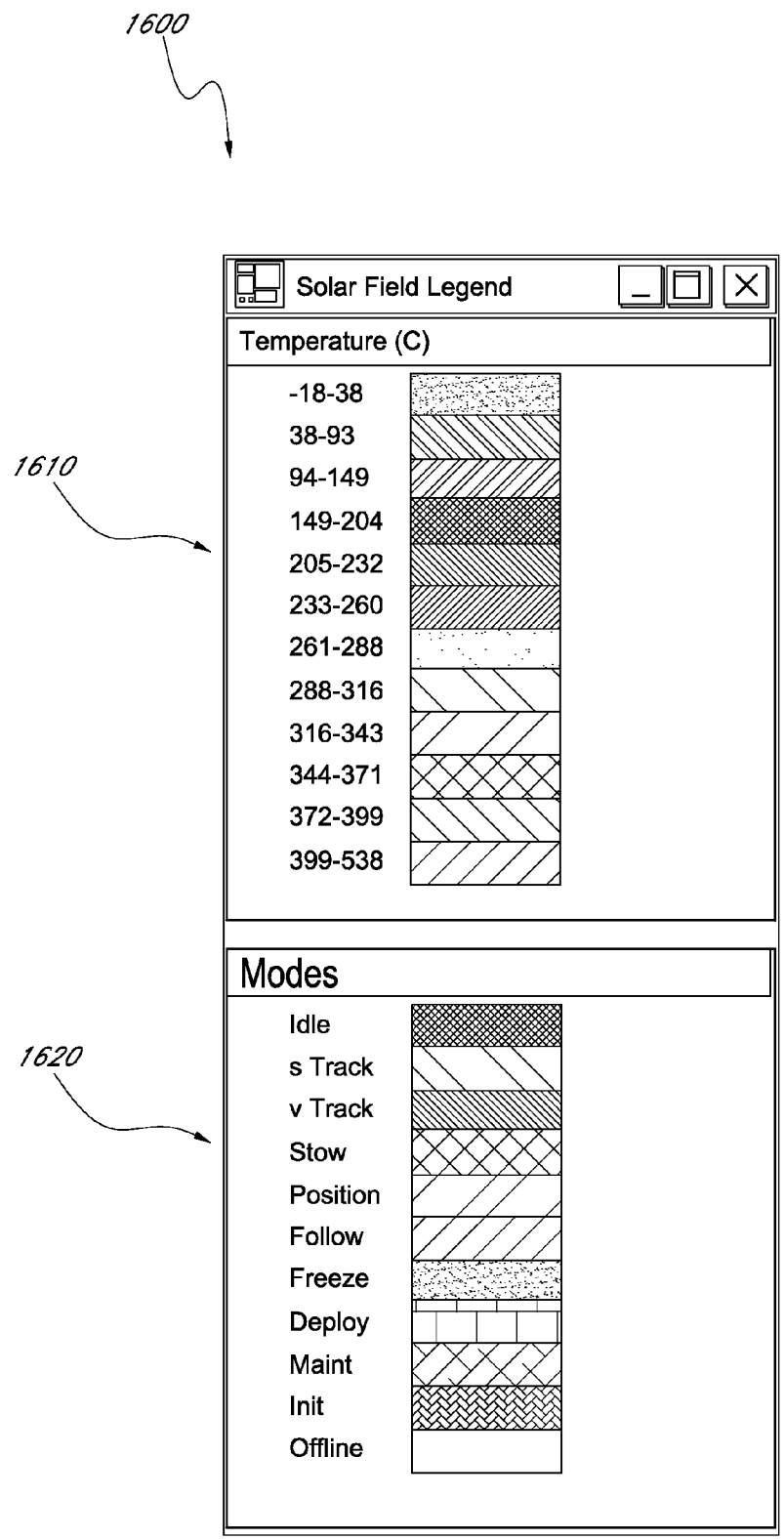

The title 1522 of the solar site display 1510 indicates the current display mode. The current display mode shown is a temperatures mode. Referring to FIG. 16, a legend display 1600 can be output alongside the solar site display 1510. The legend display 1600 can correlate colors to data for any given display mode. The example legend display 1600 includes a temperatures legend 1610 and an operating modes legend 1620. The temperatures legend 1610 provides different colors for different temperatures detected by collector thermocouples (see FIG. 5). Based on a temperature of an SCA's thermocouple reported by a collector controller to the FCS, a corresponding SCA button 1514 can be given a corresponding color according to the legend 1610.

The controller modes legend 1620 provides colors corresponding to operating modes of collector controllers, such as idle, vTrack (virtual track), and the like. Other legends can be provided for other display modes of the solar site display 1510. These legends might include alarm and collector position legends.

Figure 17:
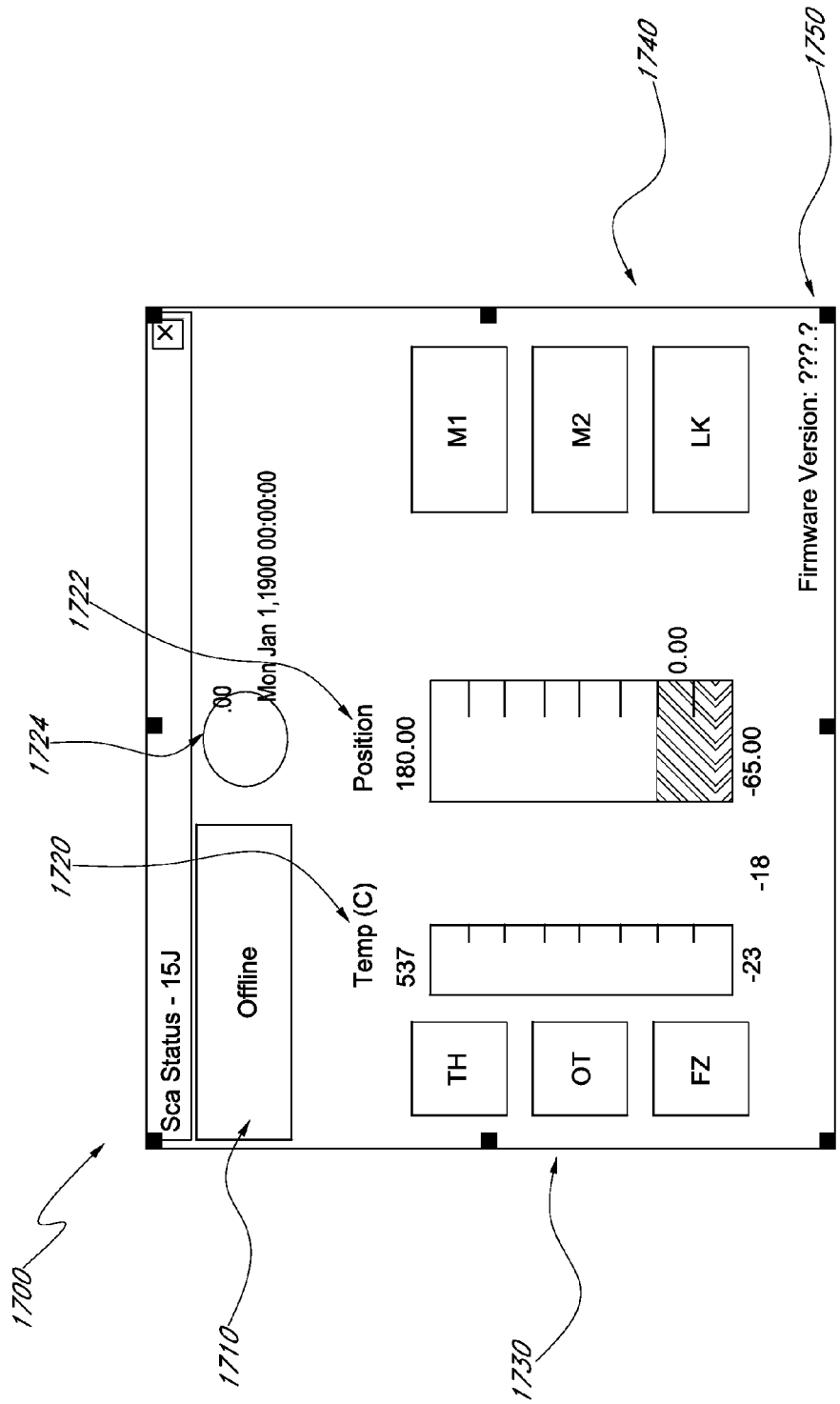

Referring again to FIG. 15, selection of an SCA button 1514 (e.g., by hovering over or clicking) can cause the FCS to output a status window for the selected SCA. An example SCA status window 1700 is depicted in FIG. 17. The SCA status window 1700 includes an indicator 1710 that indicates an operating mode of an SCA (e.g., one of the operating modes shown in FIG. 16). The current operating mode is "offline." The SCA status window 1700 also includes a temperature indicator 1720 and a collector position indicator 1722 that indicate the temperature and position of the collectors of the SCA.

The SCA status window 1700 also includes thermocouple (TH), over temperature (OT), and freeze (FZ) alarms 1730. Further, the SCA status and is 1700 includes additional alarms 1740 for both high and low speed motors (M1 and M2) and a lock (LK). A sun angle 1724 calculated by a collector controller and a firmware version 1750 are also shown.

Referring again to FIG. 15, the solar site control interface 1500 also includes an FCS operating mode display 1538, which indicates whether the FCS is in main or backup mode. When the FCS is in main mode, the FCS is responsible for controlling the solar site. A second FCS can be used as a backup, which may operate in backup mode unless the main FCS fails. If the main FCS fails, control of the solar site can seamlessly be transferred to the backup FCS through a failover protection process.

The solar site control interface 1500 also includes an emergency stop button 1534. Depressing the emergency stop button 1534 can cause some or all of the SCAs in the solar site to stow. A virtual sun angle indicator 1536 is also depicted. The virtual sun angle indicator 1536 can reflect a sun angle calculated by the FCS. As described above, the virtual sun angle can advantageously be calculated on individual collector controllers. However, the FCS may also calculate the virtual sun angle as a backup in case a collector controller's calculation is incorrect. If the FCS determines that a calculation on a collector controller is incorrect, the FCS can transmit virtual sun angle values to that collector controller.

A system log 1540 is also depicted, which can show interactions of an operator with the solar site control interface 1500. Also, a current command 1550 is shown, which depicts a current command being executed by one or more collector controllers. The solar site control interface 1500 also includes a menu bar 1519 they can provide an operator with access to commands, customization options (see FIGS. 22-32), maintenance options, and other windows that can display various other features. Examples of these other windows are depicted in FIGS. 18 through 21.

Referring to FIG. 18, an embodiment of a controller parameter window 1800 is shown. The controller parameter window 1800 can be displayed when an SCA button 1514 is selected from the solar site display 1510 or by accessing the window 1800 from the menu bar 1519. A variety of parameters 1810 are shown along with their values, which in the depicted embodiment are all set to null. However, if parameter data had been received for any of the parameters 1810, this parameter data would be shown. The parameters 1810 in the window 1800 can be customized, as will be described below.

Referring to FIG. 19, an embodiment of a loop status window 1900 is shown. The loop status window 1900 can be displayed by selecting a loop button 1518 from the solar site display 1510 or by accessing the window 1900 from the menu bar 1519. The loop status window 1900 includes SCA mode information 1912, SCA position information 1940, calculated sun angle information 1916, temperature information 1918, and change in temperature information 1920 that can reflect the change in temperature between thermocouples. A loop change in temperature 1930 is also displayed, which includes the change in temperature from the hottest of the coldest thermocouples in the loop. An SCA average change in temperature 1932 is also shown.

As described above, if a thermocouple is reported as having failed, the FCS could use existing known good temperatures in the loop to approximate a value for the SCA that contains the bad thermocouple. This virtual temperature can be displayed in the loop status window 1900.

An embodiment of a solar field status window 2000 is shown in FIG. 20. The solar field status window 2000 can be displayed by accessing the window 2000 from the menu bar 1519. The solar field status window 2000 can show a summary of mode information 2010 for the SCAs in the entire solar site. The mode information 2010 can give an indication of the number of SCAs that are in any given mode.

Figure 21:
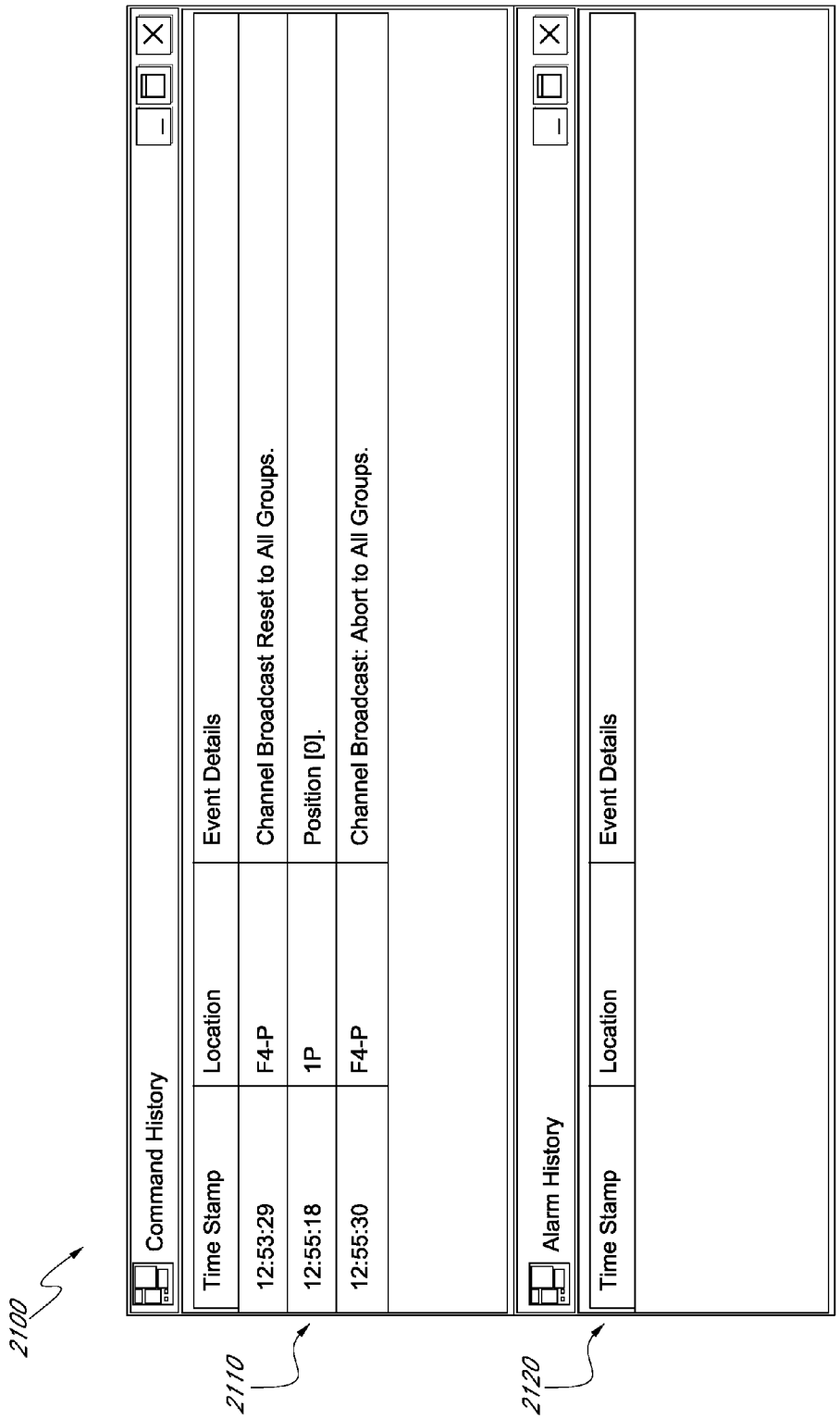

Example log windows 2100 are shown in FIG. 21. The log windows 2100 can be displayed by accessing the windows 2100 from the menu bar 1519. These log windows 2100 include a command history window 2110 and alarm history window 2120. When a command is executed, it can be logged in the command history window 2110. Similarly, when an alarm occurs, it can be logged to the alarm history window 2120.

FIGS. 22 through 32 illustrate embodiments of user interfaces for customizing the solar site control interface 1500, the FCS, and the collector controllers. These interfaces can be generated by the customization module 1060 of FIG. 10. Advantageously, in certain embodiments, these interfaces or others like them can be used to customize a solar site. Thus, these interfaces can promote scalability of solar sites.

Figure 22:
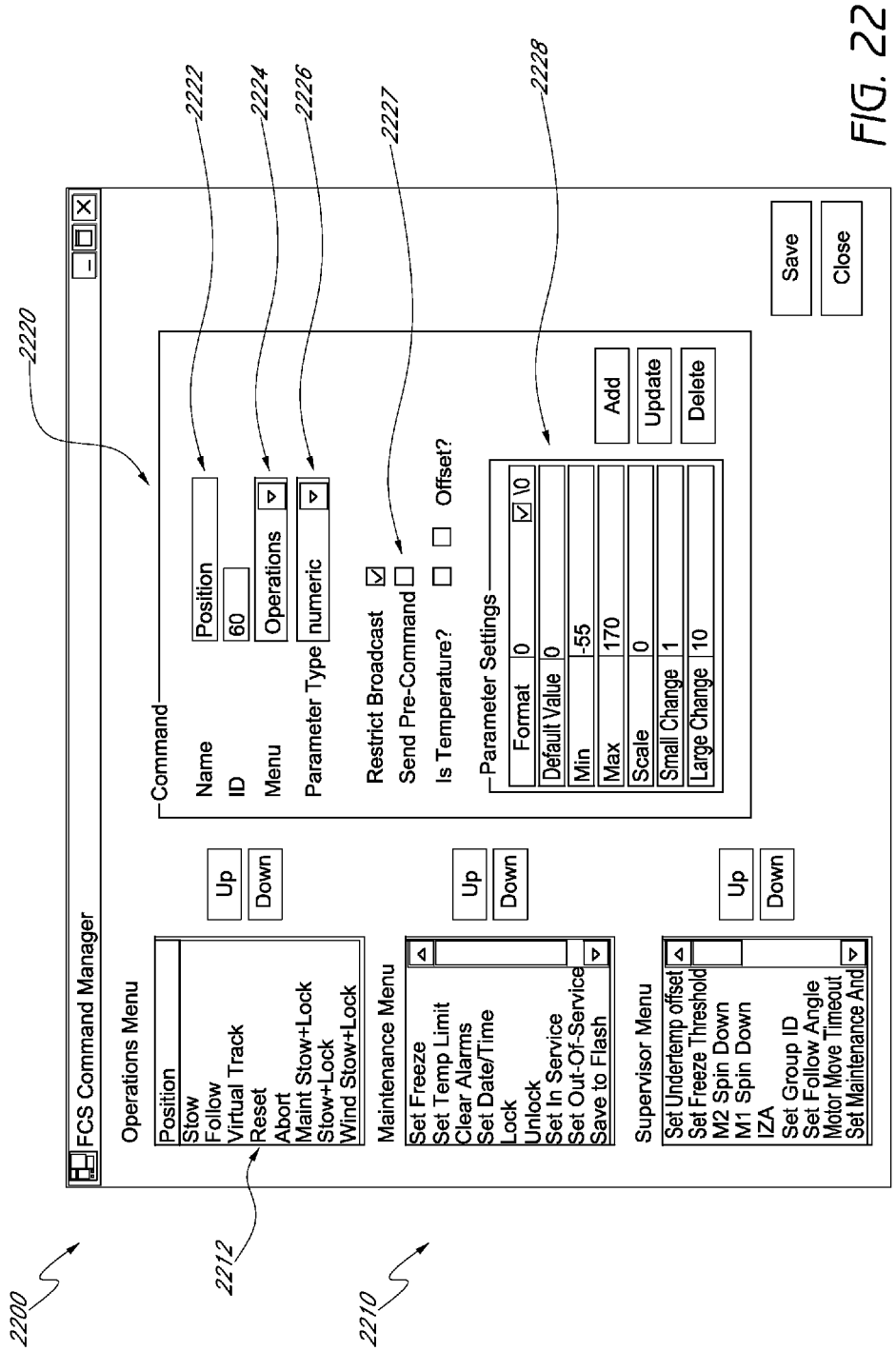
FIGS. 22 through 32 illustrate embodiments of interfaces for customizing the field control system.

Turning to FIG. 22, a command manager interface 2200 is shown. The command manager interface 2200 can allow an operator to define and/or adjust commands that can be sent from the FCS to the collector controllers. In some implementations, new commands, their format, and parameters are first defined on the collector controllers prior to defining them on the FCS with the command manager interface 2200. Alternatively, the commands used in the collector controllers can be definable from the FCS. Advantageously, in certain embodiments, the command manager interface 2200 allows for direct deployment of new functionality without reprogramming any portion of the FCS.

The command manager interface 2200 includes menus 2210 that can correspond to menus in the menu bar 1519. The example menus 2210 shown include an operations menu, a maintenance menu, and a supervisor menu. These menus 2210 include commands 2212 which can be customized using a command editor 2220. The command editor 2220 provides options for adjusting existing commands and creating new commands. For example, the command editor 2220 includes a text box 2222 for editing a name of a command. The command editor 2220 further includes a menu drop-down box 2224 for selecting which menu to include the command in (e.g., operations, maintenance, or supervisor menus).

In addition the command editor 2220 also includes a parameter type drop-down box 2226 that allows parameters to be defined for a command. In certain implementations, parameters can be numeric, date and/or time parameters, constants, or no parameters need be used with a command at all. Parameter settings 2228 can be displayed when certain types of parameters, such as numeric parameters, are selected. The example parameter setting 2228 shown allow default, min, max, and other values to be set for a parameter. The command may be associated with multiple parameters and/or parameter types in various embodiments.

Other settings 2227 are also provided. For example, these settings 2227 include a restrict broadcast setting, which enables a command to be considered a restricted command (see FIG. 12). These and other settings, including other possible settings not shown, may be used to customize and create various commands.

Figure 23:
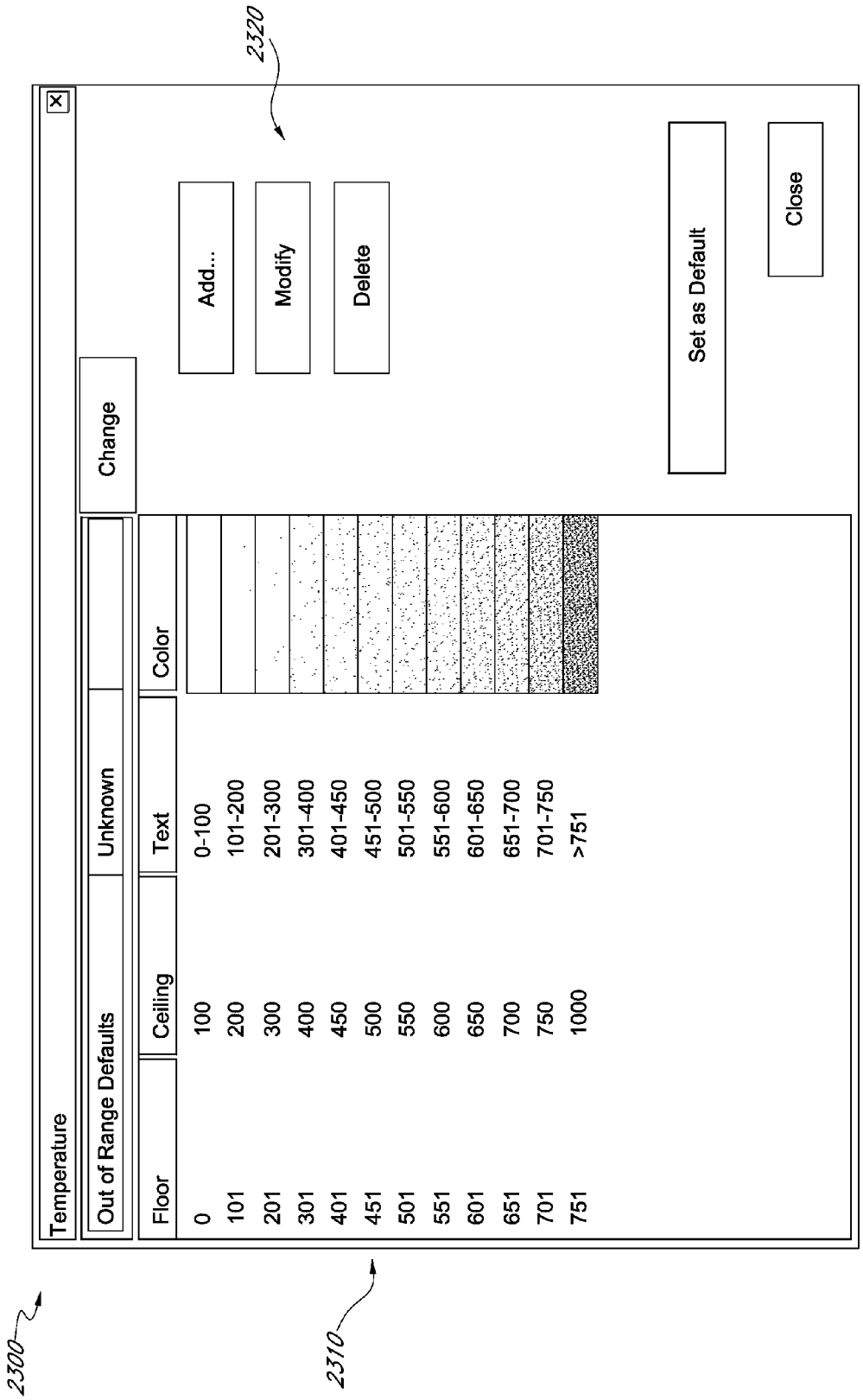
Figure 24:
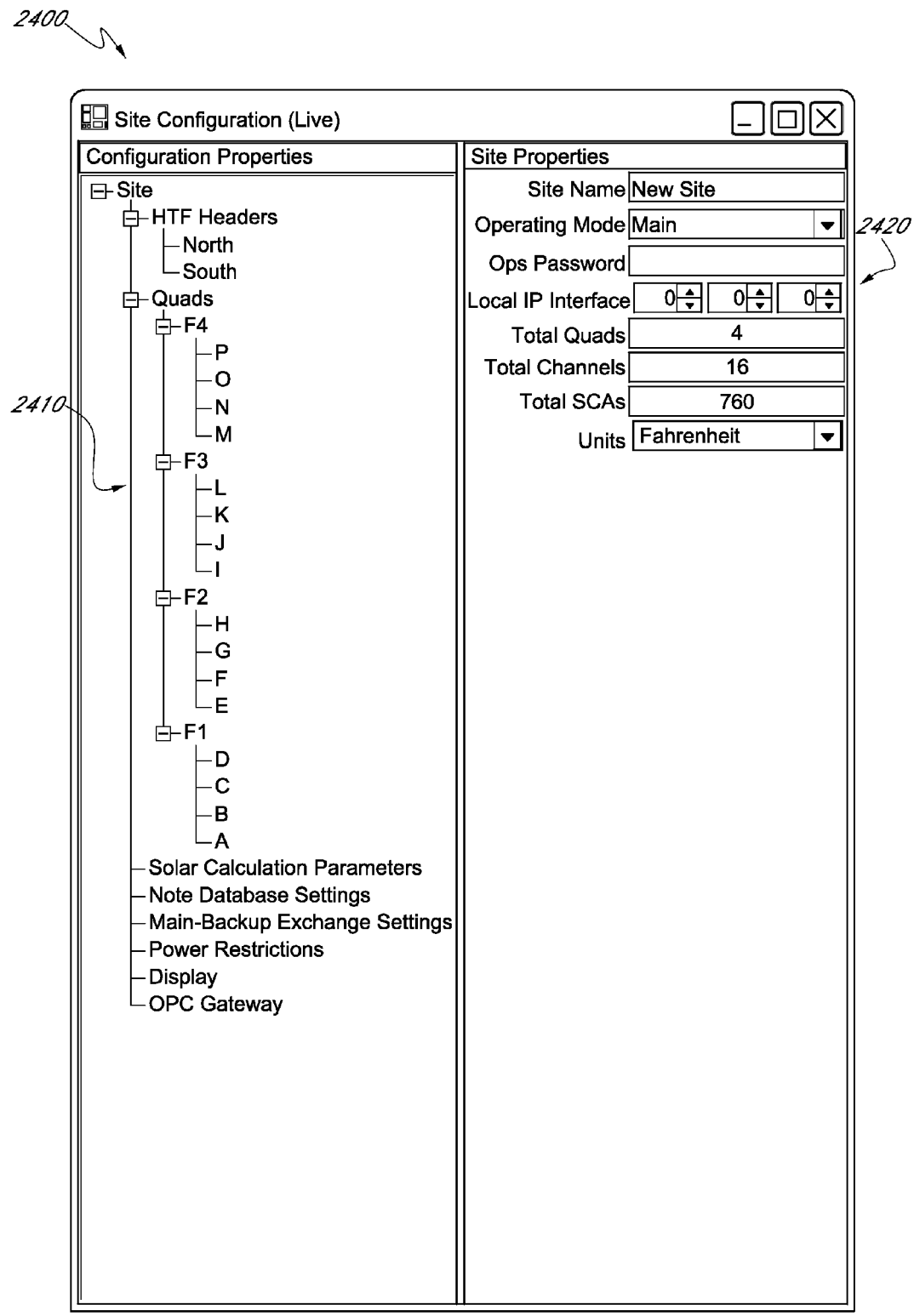

FIG. 23 illustrates an embodiment of a legend customization interface 2300. The legend customization interface 2300 allows an operator to customize the legends output by the FCS, such as the legends described above with respect to FIG. 16. In the interface 2300, an example temperature legend 2310 is shown alongside legend modification controls 2320. Using these controls 2320, colors and corresponding values of the legend 2310 can be modified. In addition, new legends can be created. A similar interface to the interface 2300, although not shown, can be used to customize the depiction of alarms displayed in the interface 1700 of FIG. 17.

FIGS. 24 through 32 depict embodiments of a site configuration interface 2400 for defining physical characteristics of the FCS and the solar site control interface 1500 of FIG. 15. The site configuration interface 2400 can save these characteristics as a template. The site configuration interface 2400 can be used to create multiple templates, so that the FCS can be used to operate different solar installations, including remote installations.

A template created with the site configuration interface 2400 can be loaded when the FCS is loaded into memory. Because this may occur, certain of the site configuration features may not be available when the FCS is running. Thus, in FIGS. 23 through 32, some of these features are grayed out to indicate this inability to modify the features during runtime. This restriction might not be present in certain embodiments.

The site configuration interface 2400 includes configuration properties 2410. These configuration properties 2410 include properties for the solar site, headers (a logical division of the solar site), fields (referred to as quads in the FIGURE), and channels (A through P in the depicted embodiment). The configuration properties 2410 also include solar calculation parameters for calculating virtual sun angles, database settings, main to backup FCS exchange settings (e.g., IP address and port settings), power restrictions, display properties, and OPC Gateway properties (see FIG. 14).

Selection of any of the items in the configuration properties 2410 can result in additional properties being displayed to the right of the configuration properties 2410. For example, selection of the "site" configuration property 2410 can cause site properties 2422 to be displayed. The example site properties shown include the name of the site, the operating mode of the FCS (e.g., main or backup), a password, a local IP interface, a total number of quads or fields, channels, and SCAs, and temperature units used (e.g., Fahrenheit or Celsius).

The local IP interface can be an IP address of a field control server running the FCS. In certain embodiments, this IP address is the only IP address that can be used to access the serial servers and/or collector controllers (see FIG. 8). Using a single IP address to connect to these devices can reduce the risk of hackers gaining access to the serial servers and/or collector controllers.

Figure 25:
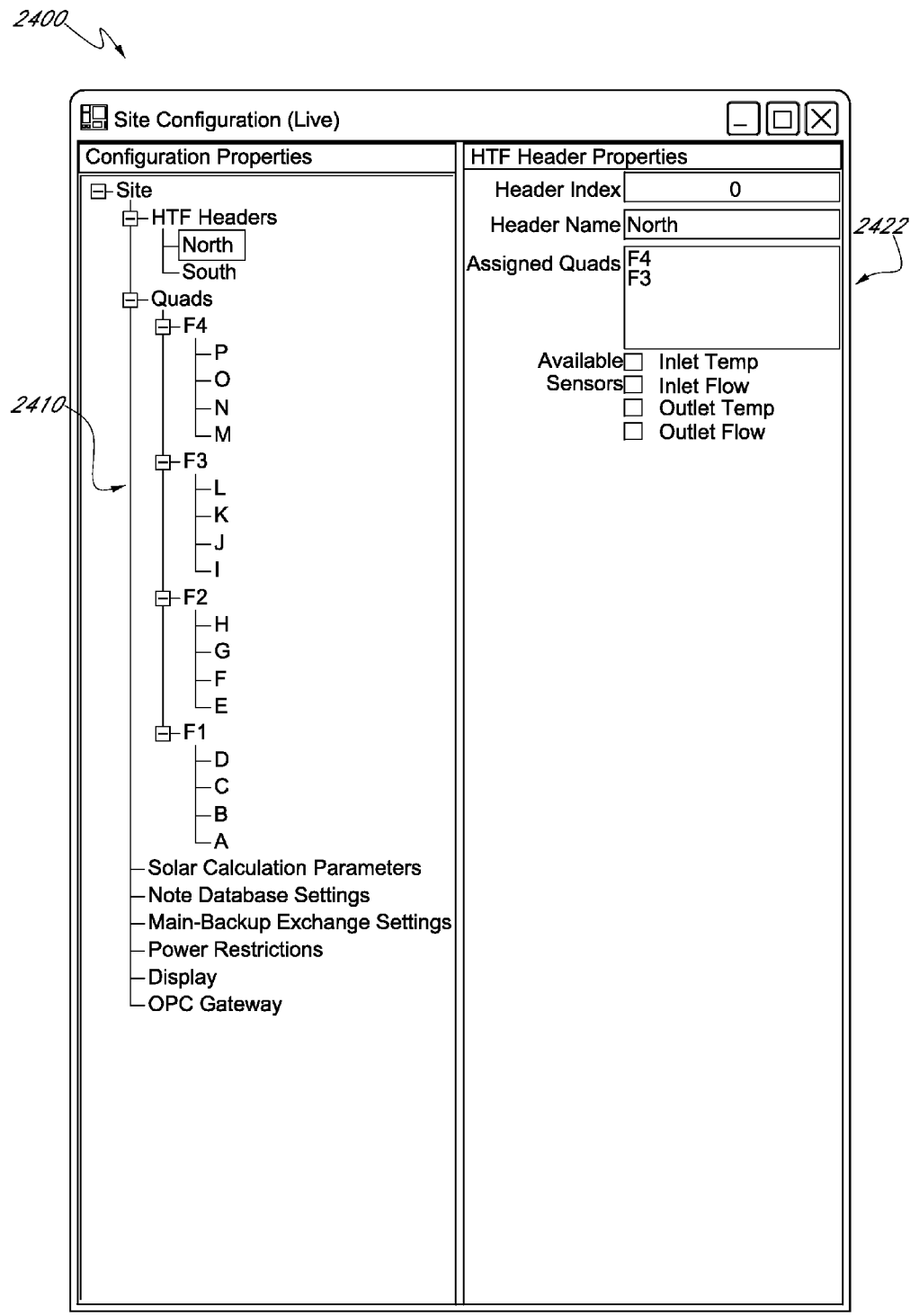

Referring to FIG. 25, one of the headers (North) in the configuration properties 2410 has been selected, causing the site configuration interface 2400 to display header properties 2422. Headers can be logical divisions of the solar site based at least in part on inlet and outlet sensors. The header properties 2422 allow header names, fields or quads, and available sensors to be defined.

Figure 26:
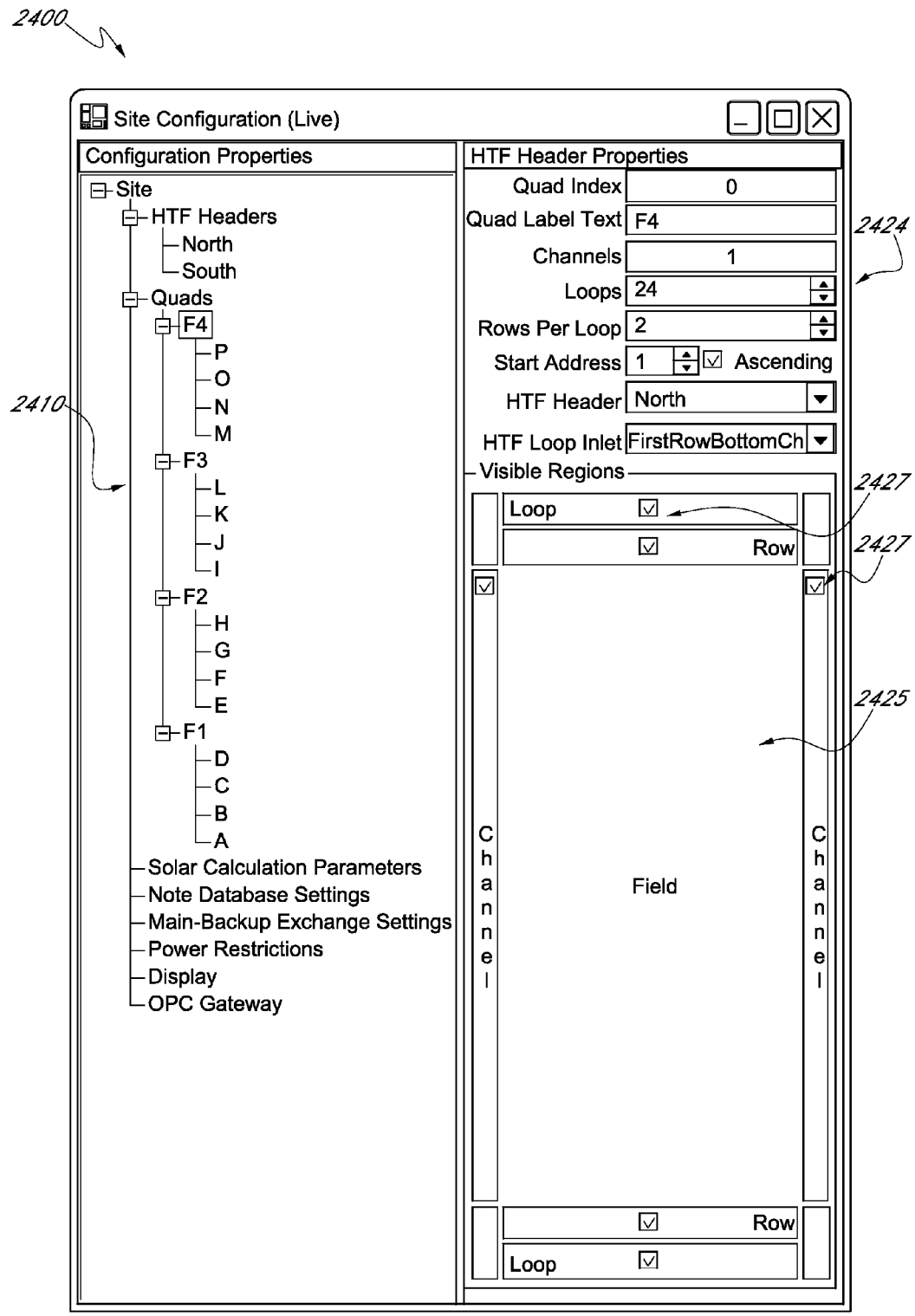

Referring to FIG. 26, one of the fields (F4) in the configuration properties 2410 has been selected, causing field properties 2424 to be displayed. These properties 2424 allow adjustment of field features, such as channels, loops, rows per loop, and so forth. In addition, a template 2425 of the selected field can include checkboxes 2427 to allow an operator to choose which types of buttons (e.g., row, loop, channel, etc.) can be shown on the solar site display 1510 of FIG. 15.

Figure 27:
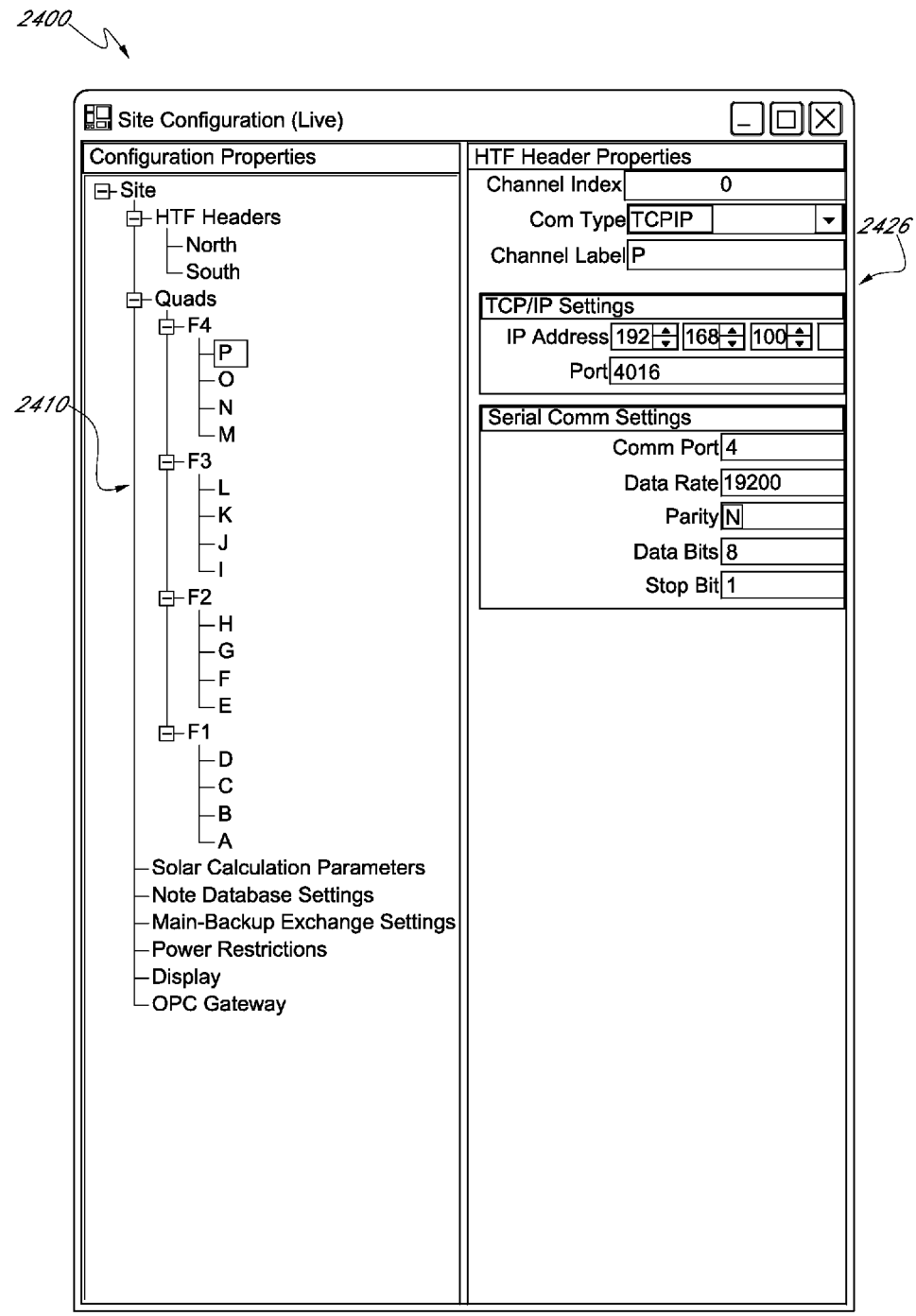

Referring to FIG. 27, one of the channels (P) in the configuration properties 2410 has been selected, causing channel properties 2426 to be displayed. These channel properties 2426 include communications type for communicating with the serial servers (e.g., TCP/IP or UPD/IP), TCP/IP or UDP/IP settings for the serial servers (e.g., IP address and port), and serial communication settings for serial ports on the serial servers to which the collector controllers connect.

Figure 28:
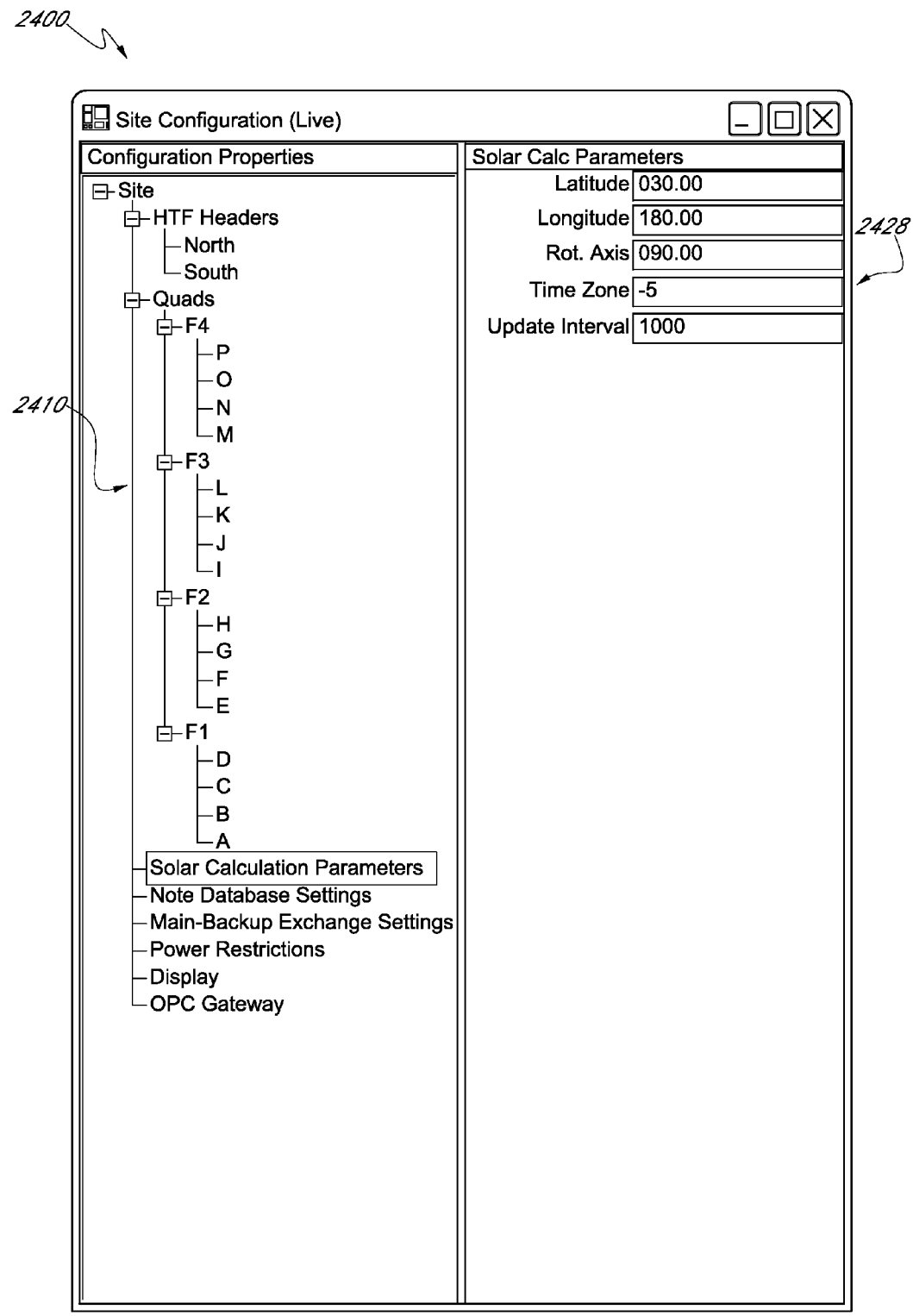

Referring to FIG. 28, the solar calculation parameters item in the configuration properties 2410 has been selected, causing solar calculation parameters 2428 to be displayed. Example solar calculation parameters 2428 shown include latitude, longitude, rotational access (e.g., rotational alignment of the collectors with respect to the sun), time zone, and an update interval. Other solar calculation parameters may be included in other embodiments.

Figure 29:
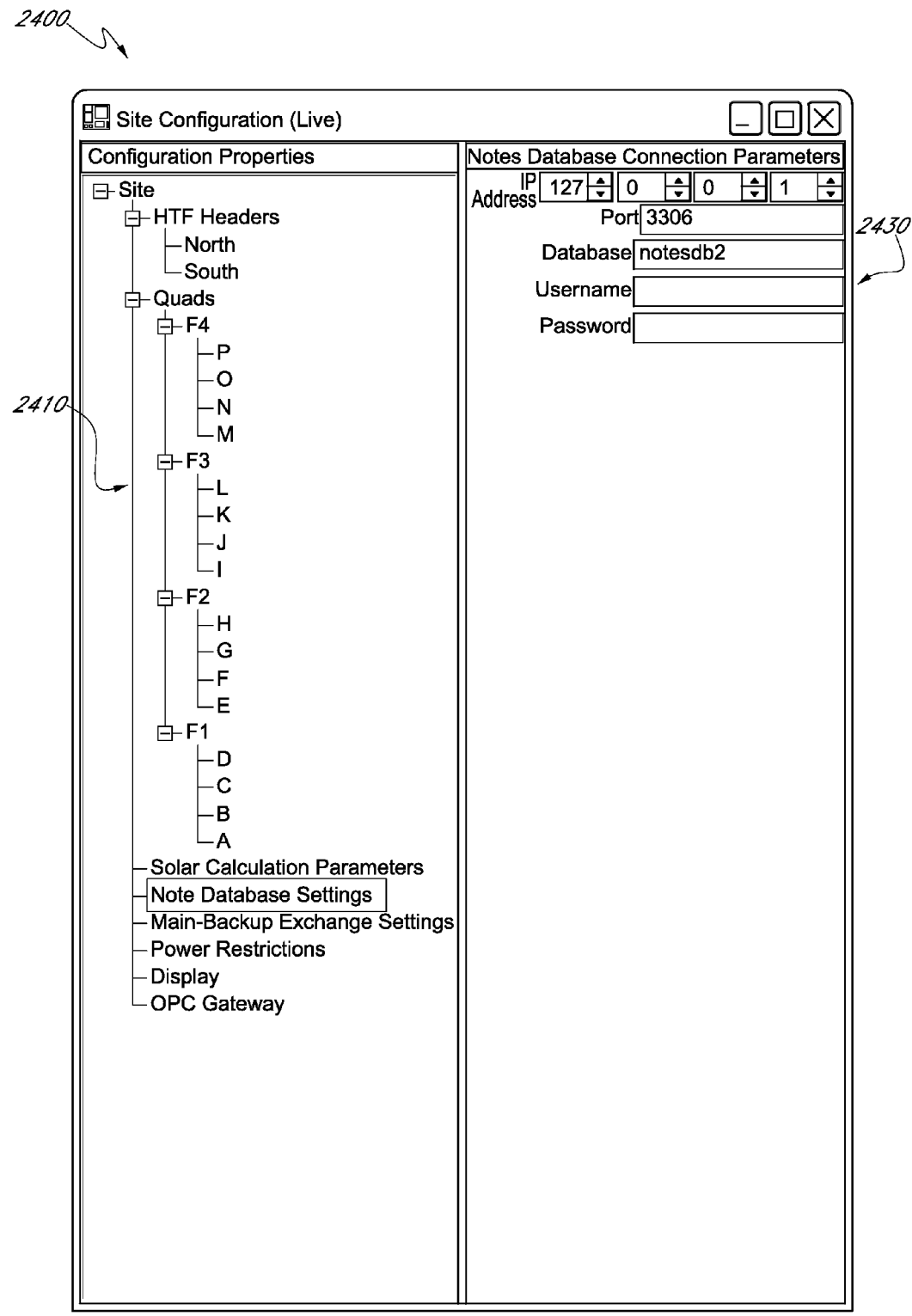

Referring to FIG. 29, the database item in the configuration properties 2410 has been selected, causing database connection parameters 2430 to be displayed. These database connection parameters 2430 can be used to connect to a database, which could be used to store FCS log data. The connection parameters 2430 include an IP address and port, database name, username, and password.

Figure 30:
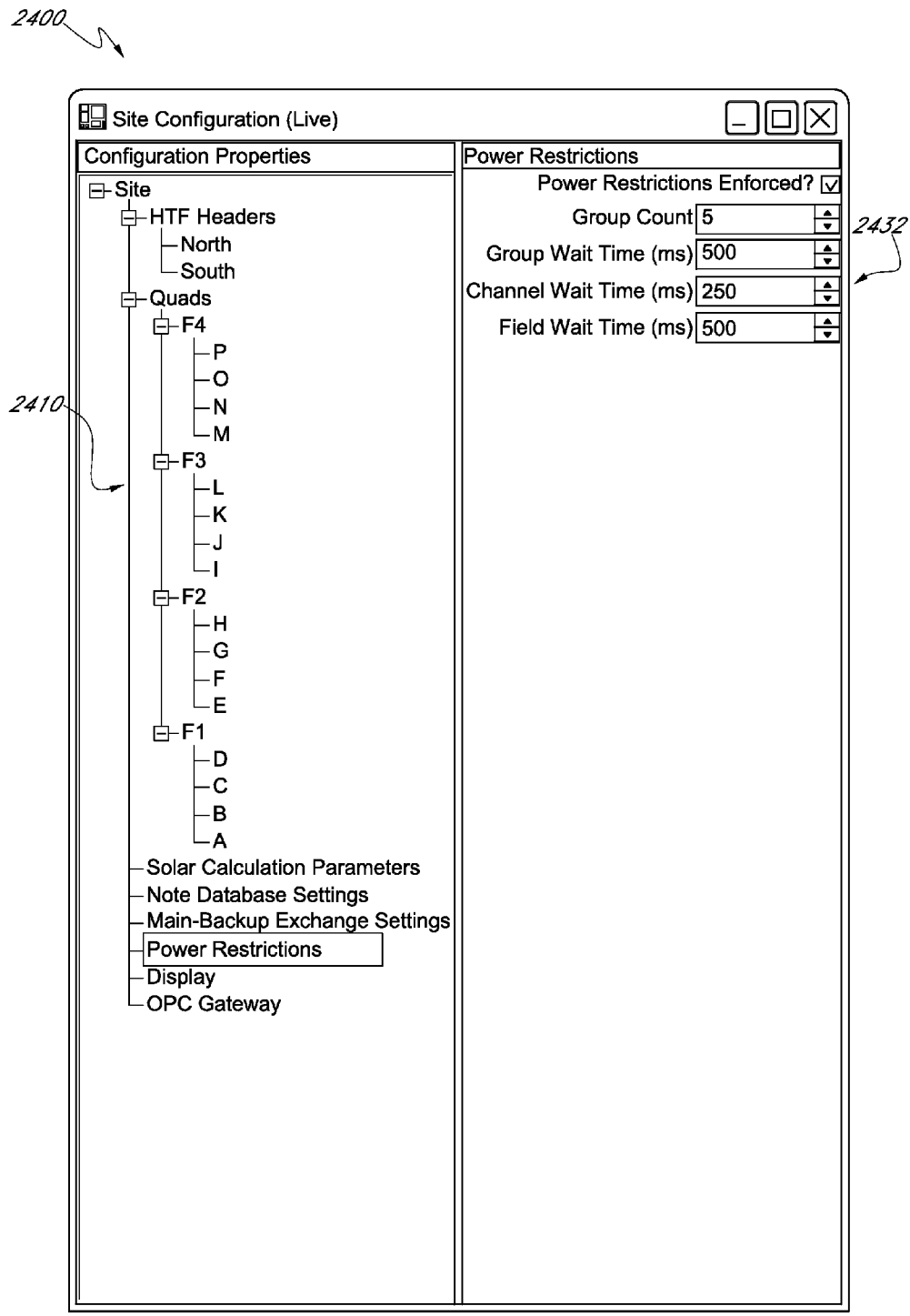

Referring to FIG. 30, the power restrictions item in the configuration properties 2410 has been selected, causing power restrictions properties 2432 to be displayed. The power restrictions properties 2432 can be used to set whether power restrictions, such as the power restrictions described above with respect to FIGS. 6 and/or 12, are enforced. The power restrictions properties 2432 also allow the number of groups to be set (e.g., corresponding to a number of group IDs) and various delays between group operations to be set.

Figure 31:
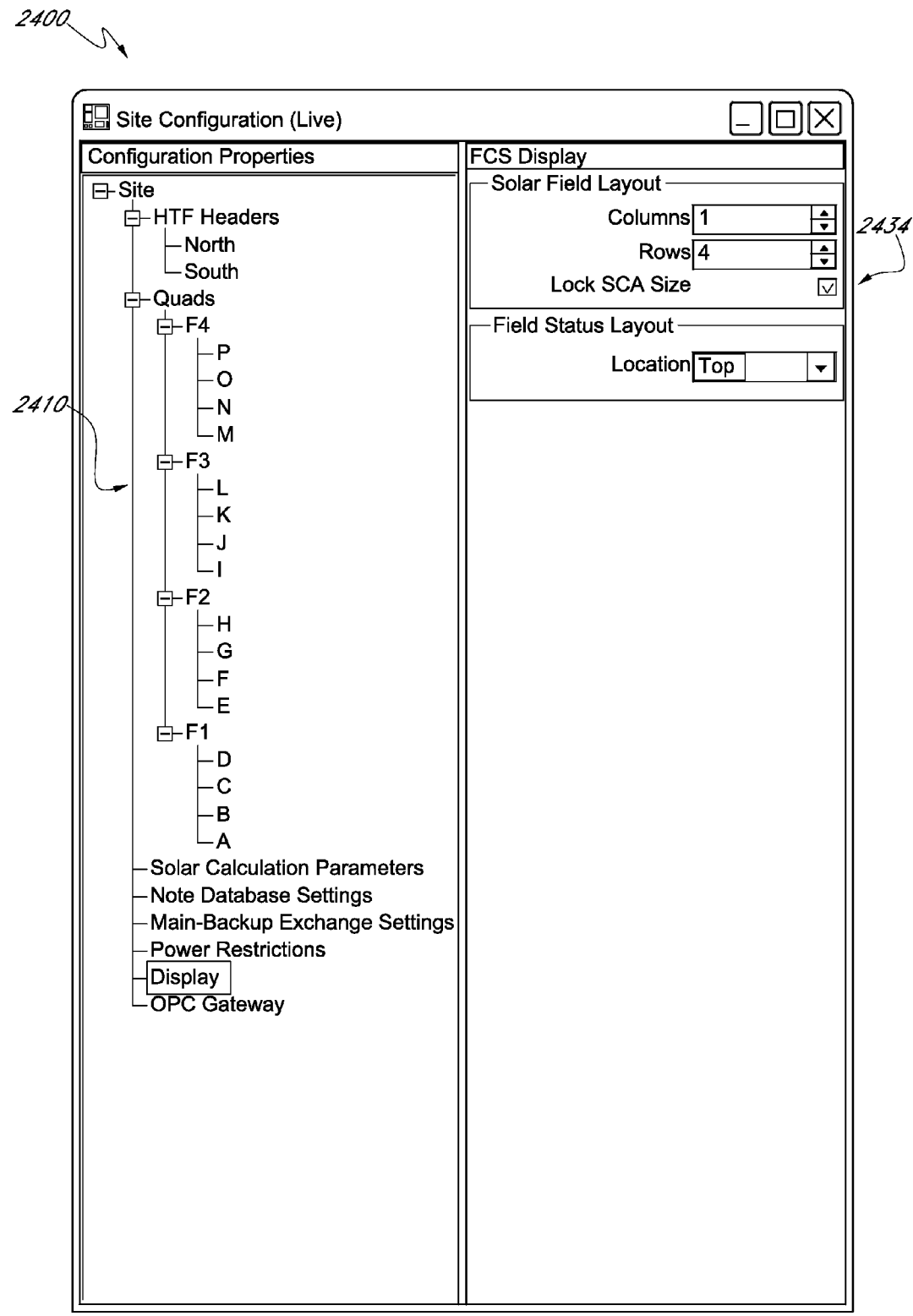
Figure 32:
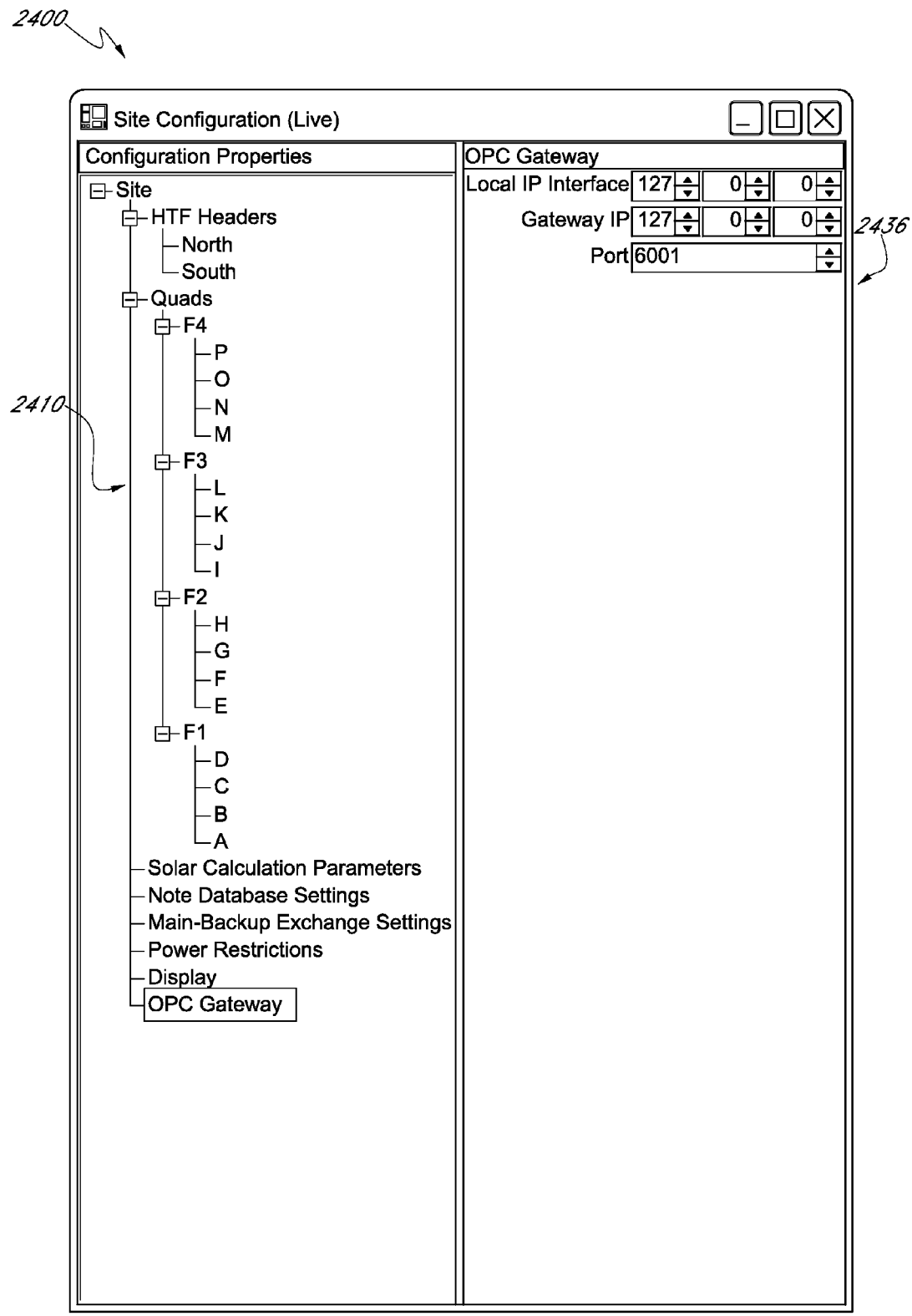

FIG. 31 depicts FCS various display options 2434 corresponding to the configuration properties 2410 display item. These items include the number of columns and rows used in the solar field layout, an option to lock the size of the SCA buttons 1514 in the solar field layout, and the location of the field status layout (the solar site display 1510). FIG. 32 depicts options 2436 for adjusting local and Gateway IP addresses and a port assignment for connecting to an OPC Gateway.

IX. Terminology

Various systems and methods have been described for providing scalability for solar power plant networks and computer systems. The various components, user interfaces, and processes described herein are merely illustrative of scalable solar power plant networks and systems. Many other variations may be made to the systems and methods without departing from the scope of this disclosure.

Depending on the embodiment, certain acts, events, or functions of any of the algorithms described herein can be performed in a different sequence, can be added, merged, or left out all together (e.g., not all described acts or events are necessary for the practice of the algorithm). Moreover, in certain embodiments, acts or events can be performed concurrently, e.g., through multi-threaded processing, interrupt processing, or multiple processors or processor cores, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a processor, controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A method of processing solar field control commands, the method comprising:
    receiving a variable-length data packet with a collector controller of a plurality of collector controllers in a solar field, each of the collector controllers configured to control one or more solar collectors in the solar field, the variable-length data packet comprising:
        a header segment identifying a staged command to be performed by the plurality of collector controllers, the staged command comprising a group identifier configured to indicate a group of the collector controllers authorized to execute the staged command at a given point in time, and
        a data segment comprising one or more parameters associated with the staged command, the data segment having a length that depends on a type of the staged command;
    determining, with the collector controller, whether the collector controller is part of the group authorized to execute the staged command;
    determining, with the collector controller, whether an angle of the one or more solar collectors with respect to the sun is within a virtual track deadband;
    in response to the collector controller not being in the group authorized to execute the staged command, waiting to transmit a motor start signal from the collector controller to a motor connected to the one or more solar collectors so as to limit power drawn by the motor on an uninterruptible power supply; and
    in response to the collector controller being in the authorized group and the angle of the one or more solar collectors with respect to the sun being outside of the virtual track deadband, executing the staged command with a processor of the collector controller to cause the motor to actuate the one or more solar collectors.

2. The method of claim 1, wherein the variable-length data packet enables the collector controller to be upgraded without redesigning a communication protocol associated with the variable-length data packet.

3. The method of claim 1, further comprising receiving a second variable-length data packet comprising a second command and a second data segment, the second data segment having one more second parameters different in length from the one or more parameters associated with the staged command initially received by the collector controller.

4. The method of claim 1, wherein the variable-length data packet comprises first direction segments configured to indicate that the variable-length data packet originated with the field control server.

5. The method of claim 4, further comprising transmitting a second variable-length data packet from the collector controller to the field control server, the second variable-length data packet comprising second direction segments that are reversed from the first direction segments to thereby indicate that the second variable-length data packet originated with the collector controller.

6. A solar collector controller configured to process solar field control commands, the solar collector controller comprising:
    a network interface configured to receive a variable-length data packet with a collector controller, the collector controller configured to control one or more solar collectors, the variable-length data packet comprising:
        a header segment identifying a staged command to be performed by the collector controller, the staged command comprising a group identifier configured to indicate a group of collector controllers authorized to execute the staged command, and
        a data segment comprising one or more parameters associated with the staged command, the data segment having a length that depends on a type of the staged command; and
    a processor configured to:
        determine whether the collector controller is part of the group authorized to execute the staged command;
        determine whether an angle of the one or more solar collectors with respect to the sun is within a virtual track deadband;
        in response to the collector controller not being in the group authorized to execute the staged command, wait to transmit a motor start signal from the collector controller to a motor connected to the one or more solar collectors so as to limit power drawn by the motor on an uninterruptible power supply; and
        in response to the collector controller being in the authorized group and the angle of the one or more solar collectors with respect to the sun being outside of the virtual track deadband, execute the staged command in response to receiving the data packet.

7. The solar collector controller of claim 6, wherein the variable-length data packet enables the solar collector controller to be upgraded without redesigning a communication protocol associated with the variable-length data packet.

8. The solar collector controller of claim 6, wherein the variable-length data packet comprises first direction segments configured to indicate that the variable-length data packet originated with the field control server.

9. The solar collector controller of claim 8, wherein the network interface is further configured to transmit a second variable-length data packet from the solar collector controller to the field control server, the second variable-length data packet comprising second direction segments that are reversed from the first direction segments to thereby indicate that the second variable-length data packet originated with the solar collector controller.

10. A method of processing solar field control commands, the method comprising:
    receiving a command broadcasted to a plurality of collector controllers with a selected one of the collector controllers, each of the plurality of collector controllers configured to control one or more solar collectors of a solar field;

identifying, with the selected collector controller, a group identifier specified by the command, the group identifier being configured to identify a subgroup of the plurality of collector controllers, the subgroup being authorized to execute the command;

determining, with the selected collector controller, whether the group identifier corresponds to a preassigned group identifier of the selected collector controller;

determine, with the selected collector controller, whether an angle of the one or more solar collectors with respect to the sun is within a virtual track deadband;

in response to determining that the group identifier does not correspond to the preassigned group identifier, waiting to transmit a motor start signal to a motor in communication with the selected collector controller so as to limit power drawn by the motor on an uninterruptible power supply; and executing the command in a processor of the selected collector controller in response to determining that the group identifier corresponds to the preassigned group identifier and that the angle of the one or more solar collectors with respect to the sun is outside of the virtual track deadband.

11. The method of claim 10, wherein the command is broadcasted by a field control server, and wherein the field control server is configured to delay issuing the command to a second subgroup of the plurality of collector controllers to thereby reduce a power load on the uninterruptible power supply, which provides power to more than only one subgroup of the plurality of collector controllers.

12. The method of claim 11, wherein the field control server is further configured to iterate the command for the subgroup of collector controllers and the second subgroup of collector controllers.

13. The method of claim 10, wherein the subgroup is selected from a group consisting of: one or more channels of the collector controllers, one or more rows of the collector controllers, one or more loops of the collector controllers, and one or more fields of the collector controllers.

14. The method of claim 10, wherein the command is received as part of a variable-length data packet.

* * * * *

UNITED STATES PATENT AND TRADEMARK OFFICE
CERTIFICATE OF CORRECTION

| | |
|---|---|
| PATENT NO. | : 8,630,293 B2 |
| APPLICATION NO. | : 12/844749 |
| DATED | : January 14, 2014 |
| INVENTOR(S) | : Cohen et al. |

Page 1 of 1

It is certified that error appears in the above-identified patent and that said Letters Patent is hereby corrected as shown below:

On the Title Page in column 2 (page 2, item 56) at line 13, Under Other Publications, change "2CDC12580556B0202." to --2CDC1250556B0202.--.

In the Specification

In column 6 at line 9, Change "222" to --222.--.
In column 6 at line 15, Change "Rakine" to --Rankine--.
In column 14 at line 45, Change "11006" to --1100B--.
In column 14 at line 52, Change "11006" to --1100B--.
In column 14 at line 59, Change "11006" to --1100B--.
In column 15 at line 7, Change "11006," to --1100B,--.
In column 15 at line 21, Change "11006" to --1100B--.
In column 15 at line 23, Change "11006" to --1100B--.
In column 15 at line 24, Change "11006" to --1100B--.
In column 15 at line 28, Change "11006" to --1100B--.
In column 15 at line 30, Change "11006." to --1100B.--.
In column 15 at line 30, Change "11006" to --1100B--.
In column 15 at line 35, Change "11006." to --1100B.--.
In column 15 at line 40, Change "11006" to --1100B--.
In column 15 at line 48, Change "11006" to --1100B--.
In column 15 at line 60, Change "11006" to --1100B--.
In column 16 at line 5, Change "11006" to --1100B--.
In column 16 at line 6, Change "11006" to --1100B--.
In column 16 at line 9, Change "11006" to --1100B--.

Signed and Sealed this
Thirtieth Day of December, 2014

Michelle K. Lee
*Deputy Director of the United States Patent and Trademark Office*